United States Patent [19]
Rananand et al.

[11] Patent Number: 5,935,213
[45] Date of Patent: *Aug. 10, 1999

[54] SYSTEM AND METHOD FOR GENERATING EXPLICIT RATE VALUE INFORMATION FOR FLOW CONTROL IN ATAM NETWORK

[75] Inventors: Nol Rananand, Pittsburgh; Jay P. Adams, Grove City; Jon C. R. Bennett, Neville Island, all of Pa.; Sandeep Shyamsukha, San Jose, Calif.

[73] Assignee: FORE Systems, Inc., Warrendale, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/641,916

[22] Filed: May 2, 1996

[51] Int. Cl.[6] ............................. G06F 13/00; G06F 13/14
[52] U.S. Cl. ...................... 709/234; 709/200; 709/232; 709/233; 709/240; 709/242
[58] Field of Search ........................... 395/200.3, 200.63, 395/200.64, 200.66, 200.68, 200.71, 200.72, 200.8, 200; 370/229–235, 252–253, 411–413; 709/200–201, 231–236, 238, 240–242, 250

[56] References Cited

U.S. PATENT DOCUMENTS

| | | | |
|---|---|---|---|
| 5,285,445 | 2/1994 | Lehnert et al. | 370/413 |
| 5,315,586 | 5/1994 | Charvillat | 370/252 |
| 5,475,682 | 12/1995 | Choudhury et al. | 370/229 |
| 5,491,801 | 2/1996 | Jain et al. | 395/200.71 |
| 5,497,371 | 3/1996 | Ellis et al. | 370/412 |
| 5,519,689 | 5/1996 | Kim | 370/232 |
| 5,528,587 | 6/1996 | Galand et al. | 395/200.64 |
| 5,613,069 | 3/1997 | Walker | 395/200.68 |
| 5,689,499 | 11/1997 | Hullett et al. | 370/235 |

Primary Examiner—Zarni Maung
Assistant Examiner—Bharat Barot
Attorney, Agent, or Firm—Ansel M. Schwartz

[57] ABSTRACT

A system and method of generating flow control information for a switching node for a digital network is disclosed. The network includes a source device and a destination device interconnected by the switching node. The source device generates cells for transmission at a selected transmission rate to the destination device over a path through the switching node to transmit data in a downstream direction from the source device to the destination device. The source device further periodically generates resource management cells for transmission to the destination device over the path in the downstream direction, and the destination device returns the resource management cells over the path in upstream direction through the switching node to the source device. The switching node includes a buffer for buffering cells transmitted in the downstream direction, a cell receiver for receiving cells from the network and buffering the received cells in the buffer, a cell transmitter for transmitting cells buffered in the buffer. The resource management cell information generator generates the flow control information for inclusion in resource management cells to be transmitted by the cell transmitter. In generating the flow control information, a maximum allowed rate value is periodically generated in response to a buffer occupancy rate identifying the current portion of the buffer currently buffering cells for transmission. The flow control information said flow control information for inclusion in a resource management cell buffered in said buffer, the flow control information being generated in relation to the maximum allowed rate value most recently generated by said periodic statistic generator and an adjustment factor value generated in relation to changes in the buffer occupancy.

35 Claims, 17 Drawing Sheets

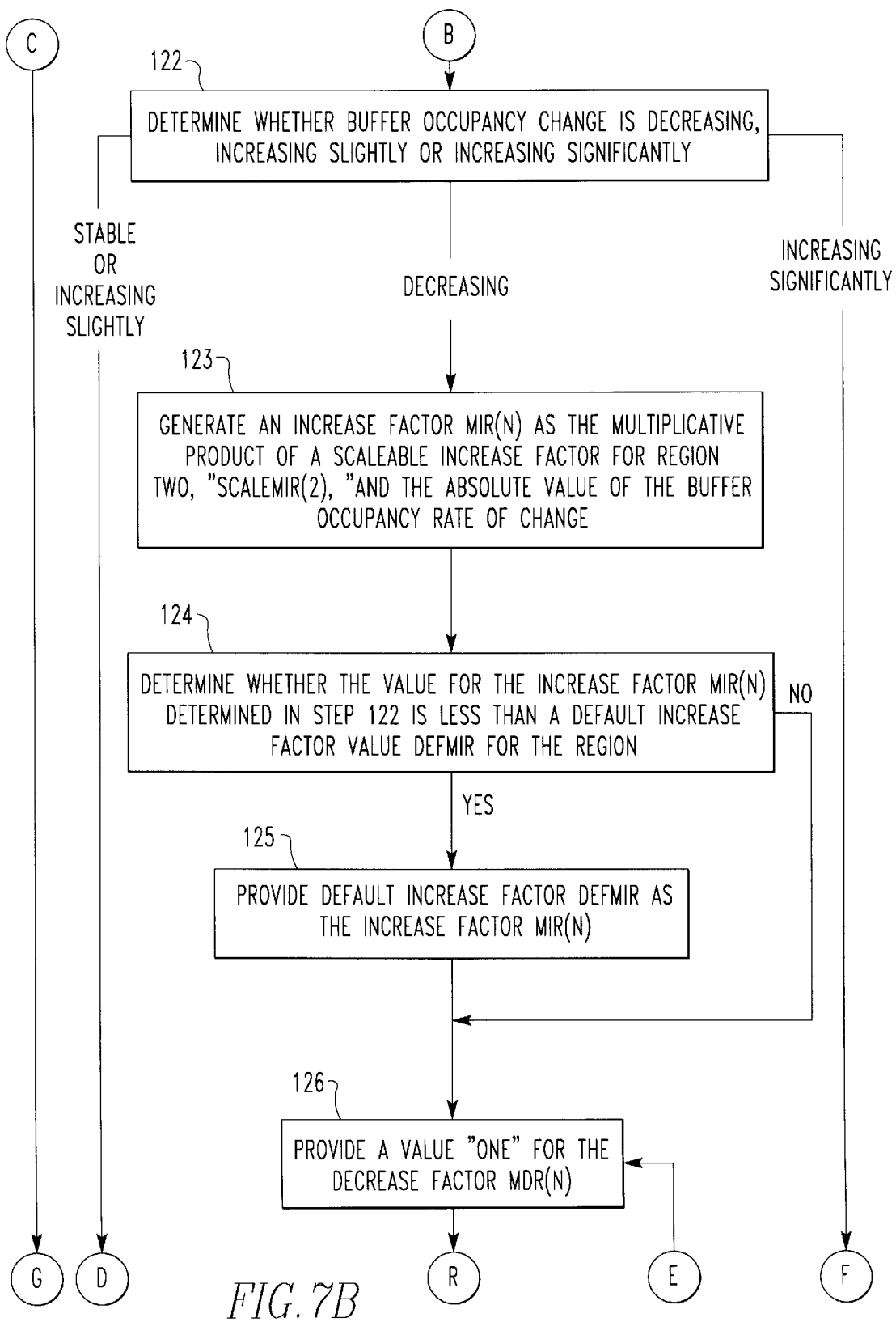

SYSTEM AND METHOD FOR GENERATING EXPLICIT RATE VALUE INFORMATION FOR FLOW CONTROL IN ATAM NETWORK

FIELD OF THE INVENTION

The invention relates generally to the field of digital communications systems and more particularly to digital networks for facilitating communication of digital data in, for example, digital image, audio and video distribution systems and among digital computer systems. The invention is more particularly directed to a digital network in which message transfer paths may be provided with various classes of transfer service, including an unregulated available bit rate service and provides a mechanism for allowing the network to control the rate at which devices transmit messages over the network based on congestion along the path between source devices and destination devices.

BACKGROUND OF THE INVENTION

Digital networks have been developed to facilitate the transfer of information, including data and programs, among digital computer systems and other digital devices. A variety of types of networks have been developed and implemented using diverse information transfer methodologies. In some networks, such as the well-known Ethernet, a single wire is used to interconnect all of the devices connected to the network. While this simplifies wiring of the network in a facility and connection of the devices to the network, it results in generally slow information transfer, since the wire can only carry information, in the form of messages, from a single device at a time. To alleviate this to some extent, in some Ethernet installations, the network is divided into a number of sub-networks, each having a separate wire, with interfaces interconnecting the wires. In such installations, wires can carry messages for devices connected thereto simultaneously, which increases the number of messages that can be transferred simultaneously. It is only when a device connected to one wire needs to send a message to a device connected to another wire that wires in two or more sub-networks will be used, making them unavailable for use by other devices connected thereto.

To alleviate this, networks have been developed in which communications are handled through a mesh of routing nodes. The computer systems and other devices are connected to various ones of the routing nodes to, as information sources, provide information for transfer over the network and/or, as destinations, for receiving information from the network, with the information that is transferred being transferred over selected paths of switching nodes comprising the network. In various types of networks, including networks in which information is transferred using the well-known "ATM" ("Asynchronous Transfer Mode") transfer methodology, various information transfer paths through the network between respective sources and destinations can be assigned classes of guaranteed transfer services, such as guaranteed rates at which information can be transferred over the respective paths in the network, as well as service classes for providing "available bit rate" services. With paths for which guaranteed service is provided, the rate levels will be controlled and regulated according to the service class. A problem arises, however, with paths associated with unregulated classes of service, to limit the cell rate so that the network resources do not become congested.

SUMMARY OF THE INVENTION

The invention provides a new and improved digital network in which message transfer paths may be provided with an unregulated "available" bit rate service, for providing flow control information to cell sources so as to avoid congestion.

In brief summary, in one aspect the invention provides a resource management cell information generator for use in connection with a switching node for a digital network. The network includes a source device and a destination device interconnected by the switching node. The source device generates cells for transmission at a selected transmission rate to the destination device over a path through the switching node to transmit data in a downstream direction from the source device to the destination device. The source device further periodically generates resource management cells for transmission to the destination device over the path in the downstream direction, and the destination device returns the resource management cells over the path in upstream direction through the switching node to the source device. The switching node includes a buffer for buffering cells transmitted in the downstream direction, a cell receiver for receiving cells from the network and buffering the received cells in the buffer, a cell transmitter for transmitting cells buffered in the buffer. The resource management cell information generator generates the flow control information for inclusion in resource management cells to be transmitted by the cell transmitter. The resource management cell information generator includes a periodic statistic generator and a flow control rate generator. The periodic statistic generator periodically updates a maximum allowed rate value in response to a rate of change of the occupancy of the buffer. The flow control rate generator generates the flow control information for inclusion in a resource management cell, in particular generating the flow control information in relation to the maximum allowed rate value most recently generated by the periodic statistic generator and an adjustment factor value generated in relation to changes in the buffer occupancy.

Another aspect of the invention is directed to a method of generating flow control information for a switching node for a digital network. The network includes a source device and a destination device interconnected by the switching node. The source device generates cells for transmission at a selected transmission rate to the destination device over a path through the switching node to transmit data in a downstream direction from the source device to the destination device. The source device further periodically generates resource management cells for transmission to the destination device over the path in the downstream direction, and the destination device returns the resource management cells over the path in upstream direction through the switching node to the source device. The switching node includes a buffer for buffering cells transmitted in the downstream direction, a cell receiver for receiving cells from the network and buffering the received cells in the buffer, a cell transmitter for transmitting cells buffered in the buffer. The resource management cell information generator generates the flow control information for inclusion in resource management cells to be transmitted by the cell transmitter. In accordance with the method, a mean allowed cell rate value is periodically generated in response to a buffer occupancy rate identifying the current portion of the buffer currently buffering cells for transmission. The flow control information is generated for inclusion in a resource management cell, the flow control information being generated in relation to the current maximum allowed rate value and an adjustment factor value generated in relation to changes in the buffer occupancy.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
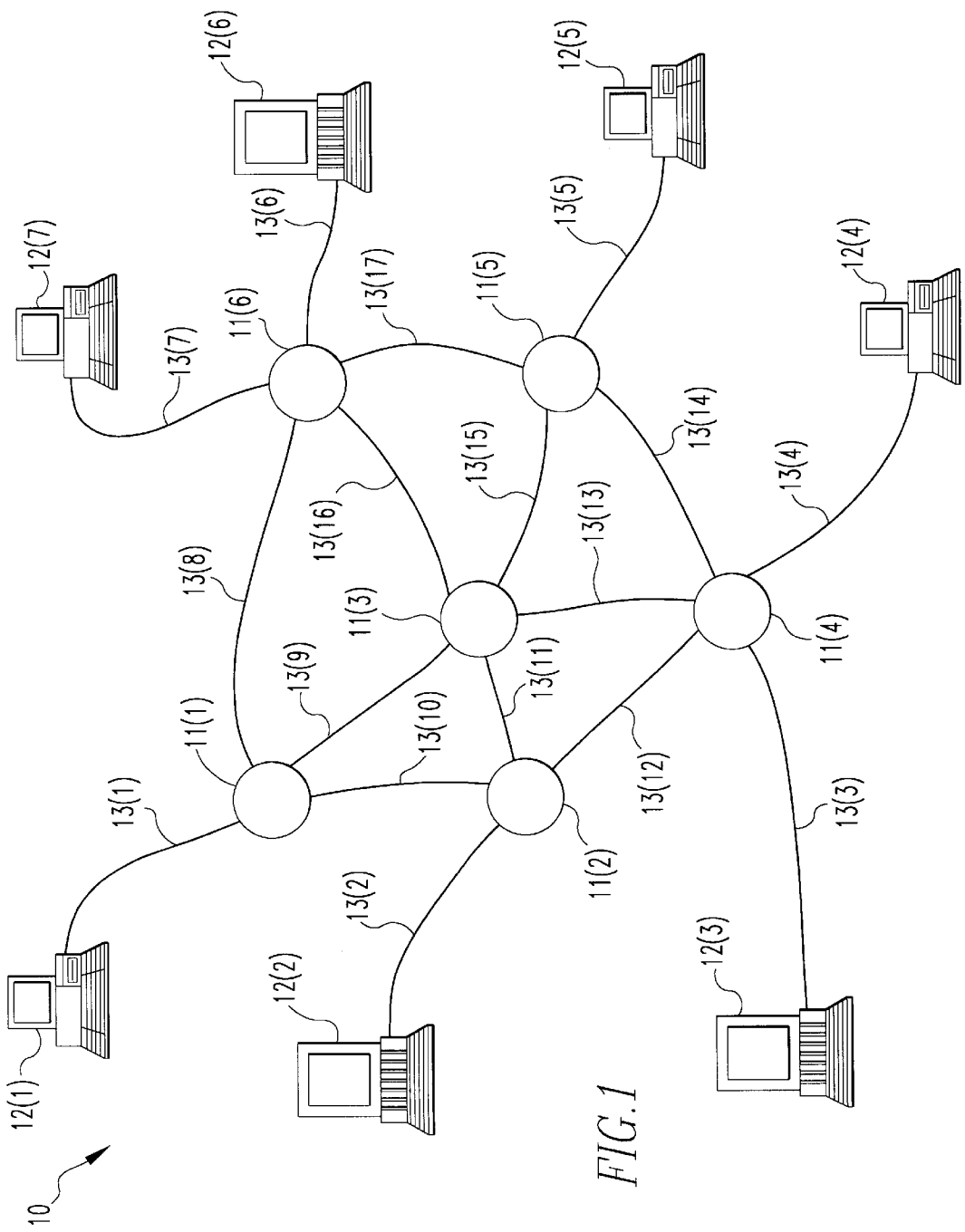
FIG. 1 schematically depicts a computer network including a routing node constructed in accordance with the invention.

FIG. 1 schematically depicts a computer network 10 including a plurality of switching nodes 11(1) through 11(N) (generally identified by reference numeral 11($n$)) for transferring signals representing data among a number of devices, which in FIG. 1 are represented by computer systems 12(1) through 12(M) (generally identified by reference numeral 12($m$)). The computer systems 12($m$), as is conventional, process data, in accordance with their program instructions to generate processed data. In their processing, a computer system 12($m_s$) (subscript "S" referencing "source") may, as a source computer system, need to transfer data, processed data and/or program instructions (all of which will be referred to herein generally as "information") to another, destination, computer system 12($m_D$) (subscript "D" referencing "destination"), which may need to use the transferred information in its operations. Each computer system 12($m$) is connected over a communication link, generally identified by reference numeral 13($l$), to a switching node 11($n$) to facilitate transmission of data thereto or the reception of data therefrom.

The switching nodes 11($n$) are interconnected by communication links, also generally identified by reference numeral 13($l$) to facilitate the transfer of data thereamong. The communication links 13($l$) may utilize any convenient data transmission medium; in one embodiment, the transmission medium of each communication link 13($l$) is selected to comprise one or more fiber optic links. Each communication link 13($l$) is preferably bi-directional, allowing the switching nodes 11($n$) to transmit and receive signals among each other and with computer systems 12($m$) connected thereto over the same link.

Figure 2:
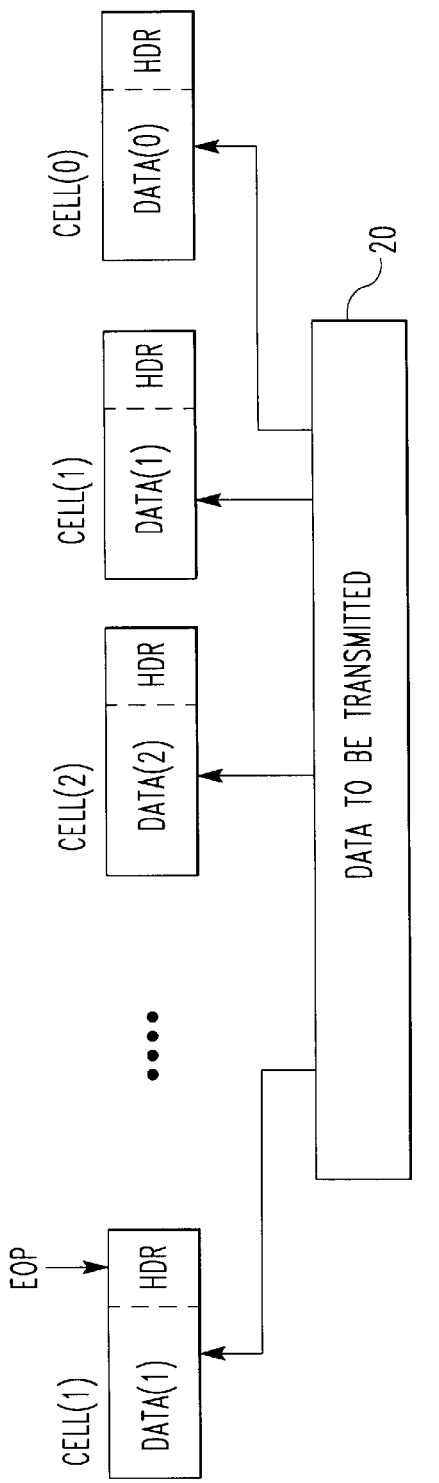
FIGS. 2 and 3 schematically illustrate the structure of message packets and constituent cells transferred over the network depicted in FIG. 1, FIG. 4 schematically illustrates the structure of a "resource management" ("RM") cell that is transferred over the network depicted in FIG. 1.
Figure 3:
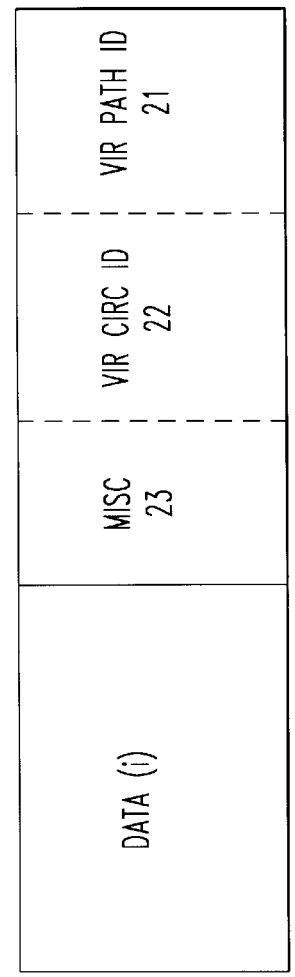

In one embodiment, the network 10 transfers data using the well-known "ATM" ("Asynchronous Transfer Mode") transfer methodology. That methodology is generally described in C. Partridge, *Gigabit Networking*, (Reading Mass.: Addison Wesley Publishing Company, 1994), primarily in chapters 3 and 4, and D. McDysan, et al., *ATM Theory And Application* (McGraw Hill, 1995) and will not be described in detail. Generally, with reference to FIG. 2, in the ATM methodology, the computer systems 12($m$) and the switching nodes 11($n$) transmit data in the form of fixed-length "cells." In the ATM data transfer methodology, for a packet 20 to be transmitted from a source computer system 12($m_S$) to a destination computer system 12($m_D$), the source computer system 12($m_S$) allocates the data packet 20 to a plurality of "cells," identified CELL(1) through CELL(I) (generally identified "CELL(i)"), for transmission serially over the communication link 13($l$) to initiate transfer thereof over the network 10. Each cell, which is shown in greater detail in FIG. 3, includes a header portion HDR(i) and a data portion DATA(i). The header portion HDR(i) includes virtual path and virtual circuit identifiers in respective fields identified by reference numerals 21 and 22, respectively, which controls the transfer of the cell over a path through switching nodes 11($n$) through the network 10 from each source computer system 12($m$S) to the respective destination computer system 12($m$D). In the aforementioned ATM methodology, the virtual path and virtual circuit identifiers which are used in transferring a particular packet from a source computer system 12($m_S$) to a destination computer system 12($m_D$) need not be the same for all switching nodes 12($n$) along the path to be used from the source computer system 12($m_S$) to the destination computer system 12($m_D$), and in addition they need not be unique across the entire computer network 10. Typically individual virtual path and virtual circuit identifiers will be assigned by the source computer system 12($m_S$) and the switching node 11($n$) connected thereto, by each pair of switching nodes along the path from the source computer system 12($m_S$) to the destination computer system 12($m_D$) and by the switching node 11($n$) connected to the destination computer system 12($m_D$) and the destination computer system 12($m_D$). Generally, a path identified by a series of virtual path and virtual circuit identifiers will be referenced herein as a "connection."

The header portion HDR(i) also includes a "miscellaneous" field 23 which includes other routing control information as will be generally described below. Both the header portion HDR(i) and the data portion DATA(i) of each cell are of fixed, predetermined lengths; in one embodiment the header portion HDR(i) comprises five bytes and the data portion DATA(i) comprises forty-eight bytes. If the amount of data to be transmitted in a message is not an integral multiple of the size of the data portion DATA(i) of each cell, the source computer system 12($m_S$) will generally pad the data portion DATA (I) of the last cell CELL(I) to ensure that the data portion DATA(I) has the required length.

As noted above, the source computer system 12($m_S$) transmits the series of cells CELL(1) through CELL(I) generated from a data packet 20 in order, and the network 10 is to deliver the cells to the destination computer system 12($m_D$) in the order in which they are transmitted. The destination computer system 12($m_D$) must receive all of the cells transmitted by the source computer system 12($m_S$) in order to reconstruct the packet 20. In the aforementioned ATM transfer methodology, the cells do not contain ordering information; and so the destination computer system 12($m_D$) determines the proper order to reconstitute the packet 20 from the order in which it receives the cells. The last cell CELL(I) includes, in the miscellaneous field 23, an end of packet indicator, designated EOP in FIG. 2, to indicate that it is the last cell for the packet.

The ATM transfer methodology defines a number of types of packet transfer classes, which are generally based on cell transfer rate guarantees which are provided to various ones of the connections over the network 10. That is, depending on the connections which have a particular service rate guarantee, the network 10 will guarantee that cells associated with those connections will be transferred at a particular rate through the network 10. This service rate may differ as among the various connections, although for various ones of the connections being serviced by a switching node 11(n) the service rate guarantees may be similar or identical. Other connections may be provided with a minimum service rate, in which case they will be ensured at least a specified minimum rate, but may be transferred faster when there is available transfer bandwidth above that required for the connections for which there is a service rate guarantee.

For yet other connections, the service rate may be unspecified, and instead be an "available" service rate, in which the network 10, and specifically the switching nodes 11(n) will transfer cells CELL(i) for those connections when there is available transfer bandwidth above that required for the connections for which there is a service rate guarantee. A problem generally in connection with connections whose service rate is unspecified is to ensure that the source computer system $12(m_S)$ does not transmit cells CELL(i) at a rate which is too large to be accommodated by the destination computer system $12(m_D)$ and the series of switching nodes 11(n) along the path between the source computer system $12(m_S)$ and destination computer system $12(m_D)$.

To enable transmission rate control information to be provided to the source computer system $12(m_S)$, the ATM transfer methodology provides for a particular type of cell, identified as a "resource management" ("RM") cell, which will be described in detail in connection with FIG. 4. Generally, a source computer system $12(m_S)$ which is transmitting cells CELL(i) in the available service rate will periodically transmit RM cells, which will be passed by successive switching nodes 11(n) along the connection in a "forward" direction to the destination computer system $12(m_D)$. When the destination computer system $12(m_D)$ receives an RM cell, it will transmit an RM cell in a "backward" direction toward the source computer system $12(m_S)$ along the same path. An RM cell traveling in the forward direction will be identified herein as a "forward RM cell" and an RM cell traveling in the backward direction will be identified as a "backward RM cell.

The destination computer system $12(m_D)$ will initially provide certain rate control information in the backward RM cell when it transmits the backward RM cell. Each switching node 11(n) along the backward direction may update the rate control information in the RM cell if it determines that, for example, because of network congestion or otherwise, it is unable to accommodate the transfer rate at the level that is indicated in the RM cell that it receives. Accordingly, when the RM cell reaches the source computer system $12(m_S)$ it will provide rate control information that regulates the rate to reflect the lower of rate at which the destination computer system $12(m_D)$ can receive cells CELL(i), or the lowest rate that can be accommodated by any of the switching nodes 11(n) along the connection. The source computer system 12(mS) may generally use the rate control information that it receives from the backward RM cells in determining the transfer rate for cells CELL(i) over the path.

In addition, the destination computer system $12(m_D)$ or a switching node 11(n) along the path from the from the source computer system $12(m_S)$ to the destination computer system $12(m_D)$ may generate RM cells, termed "backwards explicit congestion notification" RM cells, for transmission to the source computer system $12(m_S)$. The backwards explicit congestion notification RM cells may be used to provide congestion information to the source computer system $12(m_S)$ between RM cells originating from the source computer system $12(m_S)$.

Figure 4:
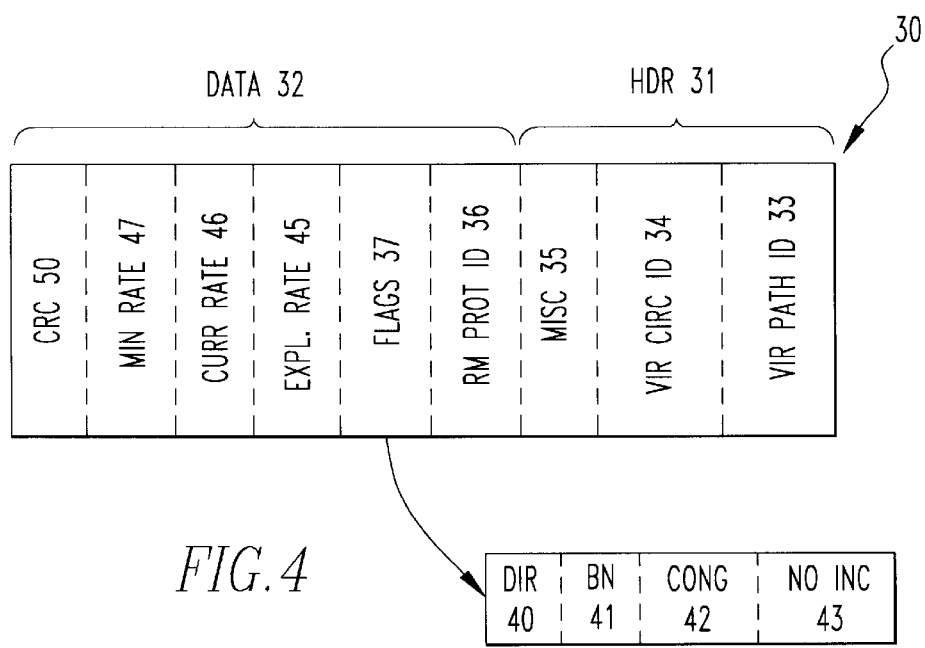

The information that is provided in an RM cell is depicted in detail in FIG. 4. With reference to FIG. 4, the RM cell 30 includes a number of fields, divided into a header portion 31 and a data portion 32. The header portion 31 includes a number of fields, namely, a virtual path identifier field 33, a virtual circuit identifier field 34 and a miscellaneous field 35, which include transfer control information corresponding to that in fields 21 through 23 of cells CELL(i) described above in connection with FIG. 3. The data portion 32 includes a number of fields which are particular to the RM cell. In particular, an RM protocol identifier field 36 includes a value that identifies the cell 30 as an RM cell. A flags field 37 includes a number of flags 40 through 43, which will be described below. An explicit rate field 45 contains an explicit transmission rate value. The source computer system $12(m_S)$ will include in the field 45 a requested explicit transmission rate value when it transmits the RM cell 30 in the forward direction. The switching nodes 11(n) will transfer the forward RM cell to the destination computer system 12(mD) with the requested explicit transmission rate value unchanged. In returning the RM cell as a backward RM cell, the destination computer system 12(mD) and switching nodes 11(n) may modify the value field 45 as described below. When the source computer system 12(mS) receives the backward RM cell, it uses value in field 45 as the above-described rate control information in determining the transfer rate for cells CELL(i) over the path.

A current rate field 46 included in the RM cell 30 contains a current cell transmission rate value that indicates the current transmission rate of source computer system $12(m_S)$. Neither the switching nodes 11(n) nor the destination computer system $12(m_D)$ modify current cell transmission rate value in field 46 of either forward RM cells or backward RM cells.

A minimum rate field 47 included in the RM cell 30 contains a minimum cell transmission value. The minimum cell transmission rate value in field 47 is set by the source computer system $12(m_S)$ to the value, if any, that was negotiated by it, the destination computer system $12(m_D)$ and the switching nodes 11(n) along the path when the path was established.

The RM cell 30 may also include information in other fields, including, for example, a CRC field 50, which contains a check value useful in determining whether the cell was properly transferred through the network.

As noted above, the RM cell 30 includes a number of flags 37. A direction flag 40 indicates whether the RM cell is a forward RM cell, that is, that it is traveling along the path from the source computer system $12(m_S)$ to the destination computer system $12(m_D)$, or a backward RM cell traveling along the path from the destination computer system $12(m_D)$ to the source computer system $12(m_S)$. The source computer system $12(m_S)$ initializes the direction flag of an RM cell to indicate that the RM cell is a forward cell, and the destination computer system $12(m_D)$ conditions the direction flag to indicate that the cell is a backward RM cell when it transmits the RM cell to the source computer system $12(m_S)$. As indicated above, the switching nodes 11(n) will pass RM cells traveling in the forward direction substantially unmodified, but they (that is, the switching nodes 11(n)) will control the rate control information for RM cells traveling in the backward direction, and so they (that is, the route nodes 11(n)) can use the direction flag 40 to determine whether the RM cell is traveling in the forward direction or the backward direction. As indicated above, the destination computer system $12(m_D)$ and switching nodes 11(n) may also generate backwards explicit congestion notification RM cells, and a backwards explicit congestion notification ("BN") flag 41 identifies the RM cell as a backwards explicit notification RM cell; since such cells 30 only travel in the backward direction, the direction flag 40 will also indicate that the RM cell is traveling in the backward direction.

The flags field 37 also include several flags used to indicate the degree of congestion in the network and which control whether the source computer system $12(m_S)$ can increase its transmission rate. A congestion indication flag 42 is used by the destination computer system $12(m_D)$ and switching nodes $11(n)$ to indicate whether congestion exists along the path between the source computer system $12(m_S)$ and destination computer system $12(m_D)$. The source computer system $12(m_S)$ will initialize the congestion indication flag 42 to indicate no congestion, and the destination computer system $12(m_D)$ and switching nodes $11(n)$ may modify the condition of the flag 42 of backward RM cells to indicate that congestion exists. If the source computer system $12(m_S)$ receives an RM cell with a congestion indication flag 42 indicating that congestion exists, it will preferably in response reduce the rate at which it transmits cells CELL (i) over the path. Finally, a "no increase" flag 43 is used by the destination computer system $12(m_D)$ and switching nodes along the path between the source computer system $12(m_S)$ and destination computer system $12(m_D)$ to inhibit the source computer system $12(m_S)$ from increasing its cell transmission rate over the path. The destination computer system $12(m_D)$ and switching nodes $11(n)$ will condition both the congestion indication flag and the no increase flag 43 in response to their respective the degrees of congestion, with the proviso a switching node $11(n)$ that receives a backwards RM cell in which the congestion indication flag 42 indicates congestion, it will not change the flag to indicate no congestion, and further if a switching node receives a backwards RM cell in which the no increase flag 42 indicates "no increase", it will not change the flag to indicate that the source computer system $12(m_S)$ may increase its cell transmission rate.

Figure 5:
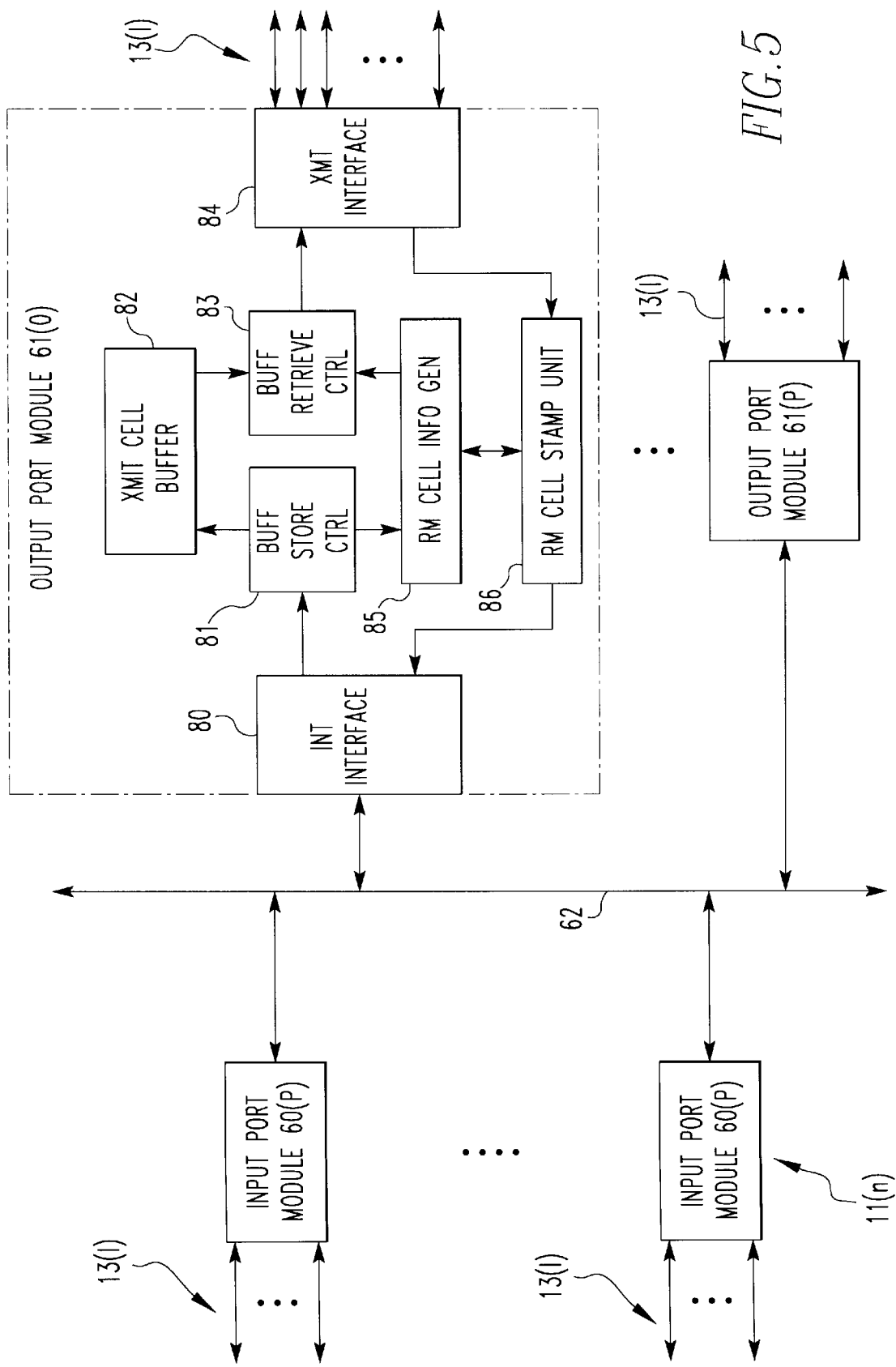
FIG. 5 schematically depicts the structure of a switching node useful in the network depicted in FIG. 1.

The invention provides a new arrangement for generating cell transmission rate control information which a switching node $11(n)$ may use in the explicit rate field 45 of a backward RM cell 30. However, before proceeding further, it would be helpful to generally describe the structure of a switching node $11(n)$ useful in the network 10 depicted in FIG. 1. FIG. 5 depicts a functional block diagram of such a switching node $11(n)$. With reference to FIG. 1, the switching node $11(n)$ includes a plurality of input port modules 60(0) through 60(P) (generally identified by reference numeral $60(p)$) and a plurality of output port modules 61(0) through 61(P) (generally identified by reference numeral $61(p)$) interconnected by one or more buses 62. Each input port module $60(p)$ is connected to a number of communication links $13(l)$, in particular for receiving signals which are representative of cells CELL(i) and forward RM cells. Each input port module $60(p)$ transfers cells CELL(i) and forward RM cells received thereby over bus 62 to the output port modules $61(p)$.

Each output port module $61(p)$ is also connected to a number of communication links $13(l)$ for transmitting signals which are representative of cells CELL(i) and forward RM cells, which it receives from an input port module $60(p)$. In addition, each output port module $61(p)$ can receive signals which are representative of backward RM cells. Each output port module $61(p)$ transfers backward RM cells received thereby over the communication links $13(l)$ connected thereto, over bus 62 to an input port module $60(p)$ for transmission toward the source computer system $12(mS)$ Each communication link $13(l)$ which is connected to a particular input port module $60(p)$ is, in turn, connected to receive cells CELL(i) and RM cells from a particular source computer system $12(m_S)$ or other switching node $11(n)$ in the network 10. Similarly, each communication link $13(l)$ which is connected to a particular output port module $61(p)$ is, in turn, connected to transfer cells CELL(i) and RM cells to a particular other switching node $11(n)$ or destination computer system $12(m_D)$ in the network 10. The number of input port modules $60(p)$ may conveniently correspond to the number of output port modules $61(p)$, and each output port modules $61(p)$ may conveniently be connected to transmit cells CELL(i) and forward RM cells to the switching nodes $11(n)$ and computer systems $12(m)$ from which input port modules $60(p)$ receive cells CELL(i) and forward RM cells.

The input port modules $60(p)$ in switching node $11(n)$ are all generally similar, and include interfacing circuitry (not separately shown) for interfacing to the communication links $13(l)$ and bus 62 and may also include some buffering (also not separately shown) for buffering cells CELL(i) and forward RM cells prior to transmission to the output port modules $61(p)$ and for buffering the backward RM cells received from the output port modules $61(p)$ prior to transmission over the respective communication links $13(l)$ connected thereto.

The output port modules $61(p)$ in switching node $11(n)$ are all generally similar, and so only output port module 61(0) will be described in detail. As shown in FIG. 5, the output port module 61(0) includes an internal bus interface 80, a buffer store control 81, a transmit cell buffer 82, a buffer retrieval control 83, an transmit interface 84, an RM cell information generator module 85 and an RM cell stamping unit 86. The internal bus interface 80 receives cells CELL(i) and forward RM cells from the bus 62 and transfers them to the buffer store control 81 for storage. The buffer store control 81, in turn, loads the cells CELL(i) and forward RM cells that it receives from the internal bus interface 80 into the cell transmit buffer 82. In one particular embodiment, the cells associated with a particular connection are stored in the cell transmit buffer 82 in queues each associated with the particular connection, and the buffer store control 81 will link each cell that it receives onto the tail of the queue associated with its (that is, the cell's) connection. The buffer store control 81 may be provided with a table (not shown) identifying, for each connection that the output port module 61(0) is currently servicing, the location of the queue for the connection in the transmit cell buffer 82, and in particular may identify the location of the last cell CELL(i) associated with the connection in the transmit cell buffer 42. The buffer retrieval control 83, on the other hand, retrieves cells, including both cells CELL(i) and the forward RM cells, from the transmit cell buffer 82, and provides the retrieved cells to the transmit interface 84 for transmission. U.S. patent appn. Ser. No. 08/628,206, filed Apr. 5, 1996, in the names of Fan Zhou, et al., entitled "Digital Network Including Mechanism For Grouping Virtual Message Transfer Paths Having Similar Transfer Service Rates To Facilitate Efficient Scheduling Of Transfers Thereover," assigned to the assignee of the present application, incorporated herein by reference, describes an arrangement used in one embodiment of this invention for queuing cells for respective connections in the transmit cell buffer 82 and scheduling them for transmission through the transmit interface 84.

The transmit interface 84 also receives backward RM cells over the communication links $13(l)$ and provides them to the RM cell stamping unit 86. The RM cell stamping unit receives the rate control information generated by the RM cell information generator module 85, loads it (that is, the rate control information) into the respective backward RM cells, and provides the backward RM cells to the internal interface 80. The internal interface 80, in turn, couples the backward RM cells over the bus 62 to the respective input port modules 60(p) for transmission as described above.

Figure 6:
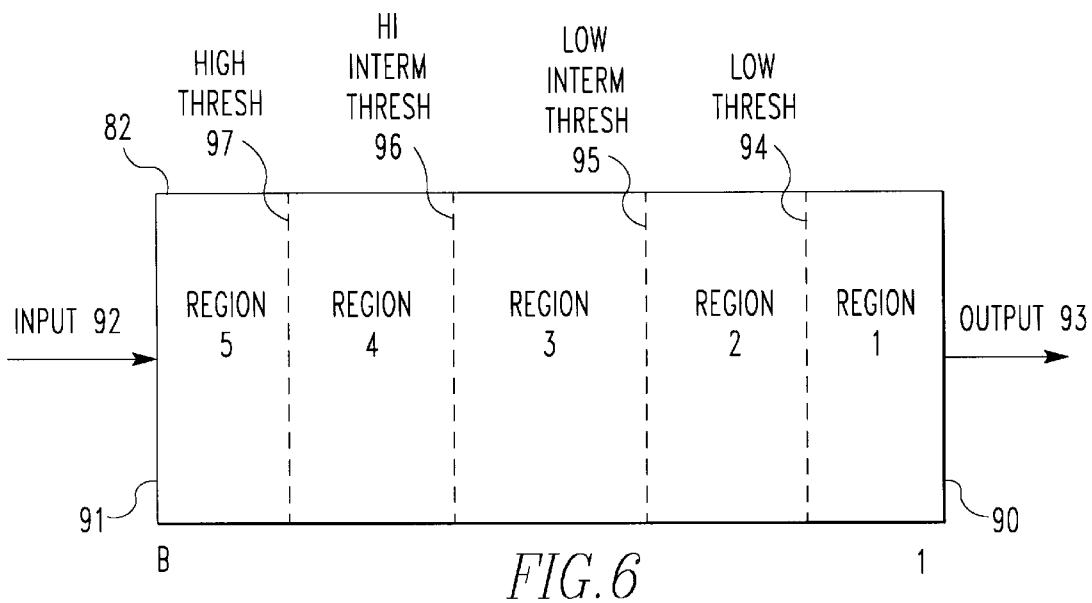
FIG. 6 is a diagrams useful in understanding the operation of the routing node depicted in FIG. 5.
Figure 7:
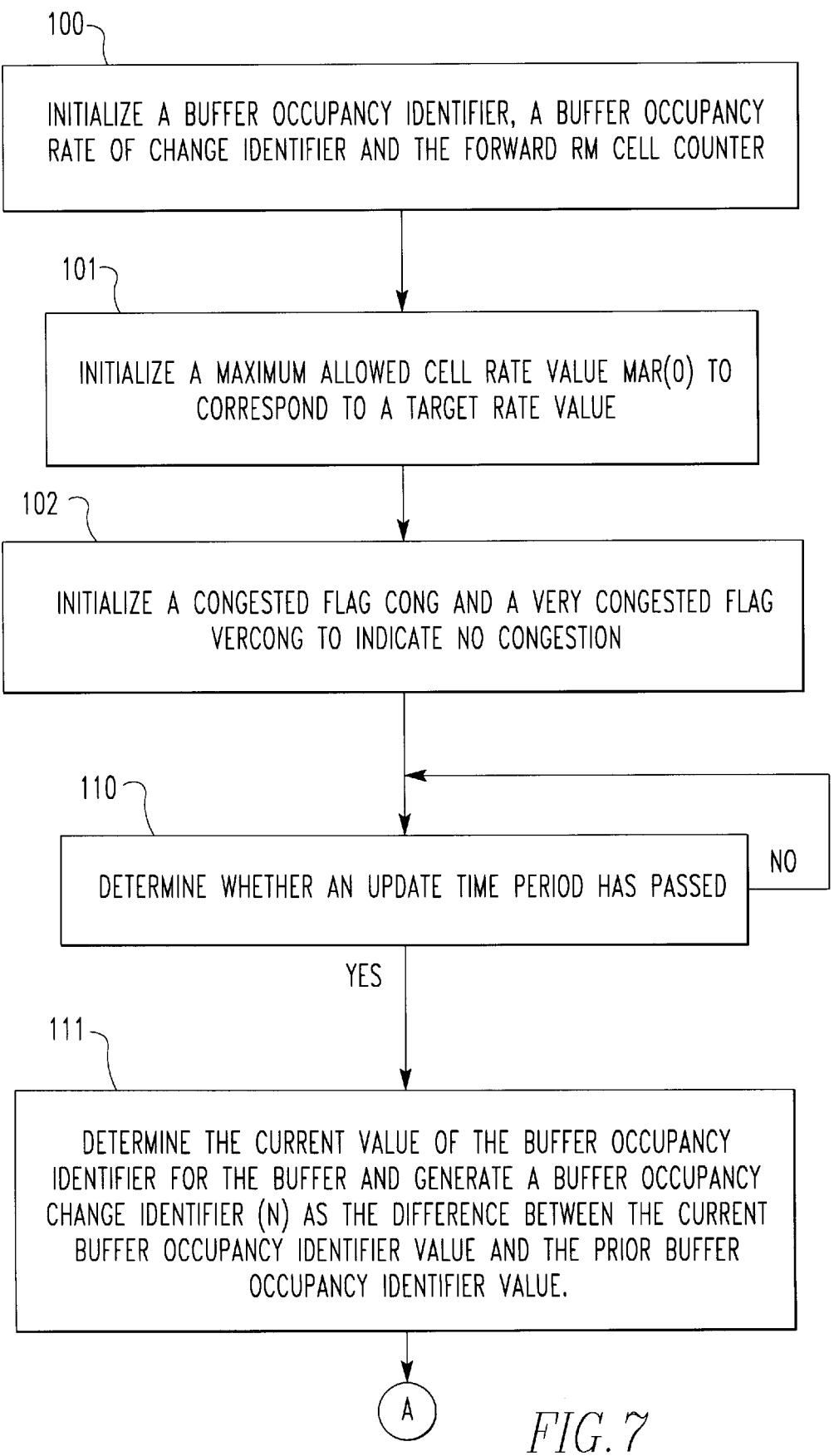
FIGS. 7A–7H and 8A–8C are flow charts illustrating the operations of the switching node in accordance with the invention.
Figure 7A:
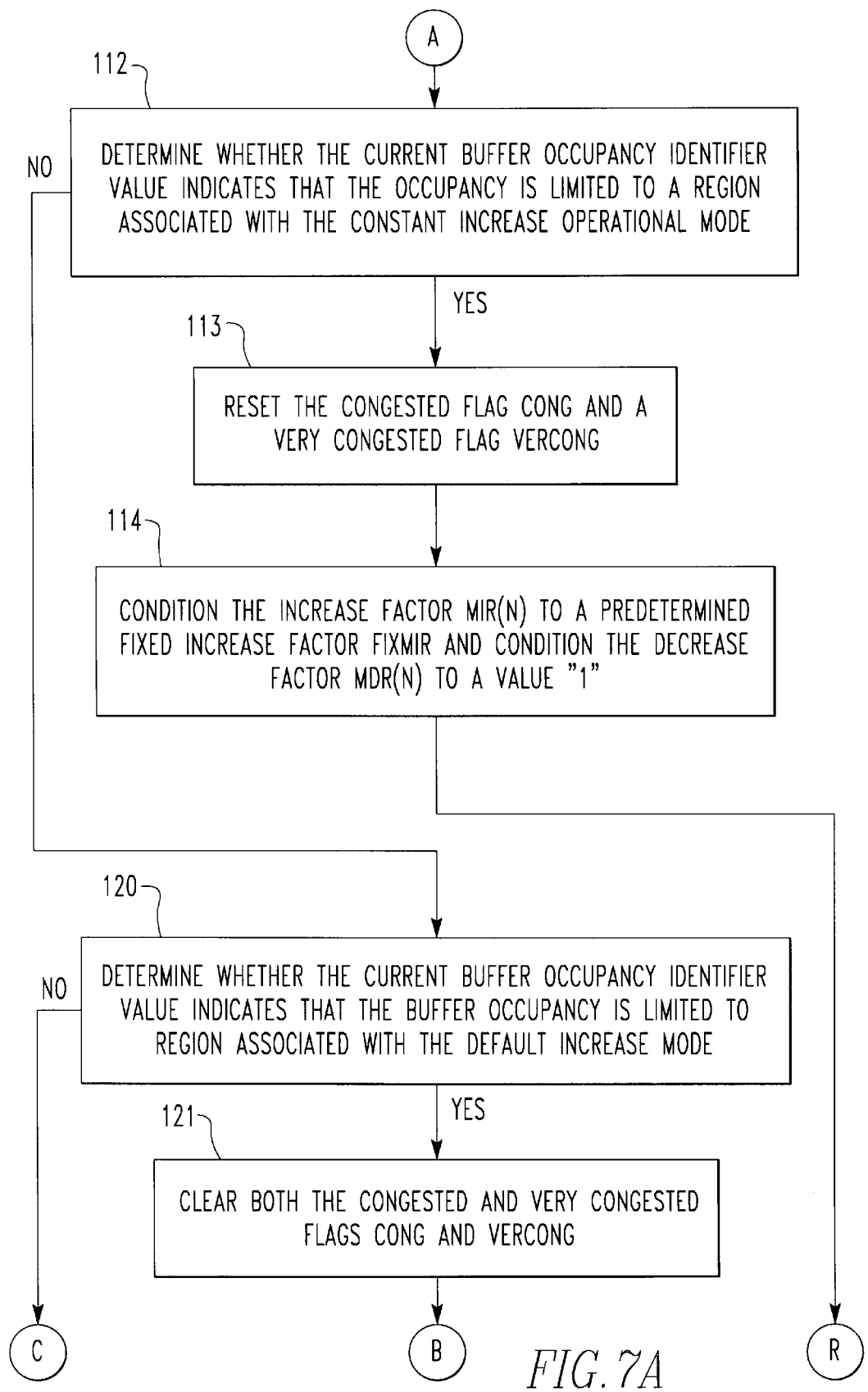
Figure 7C:
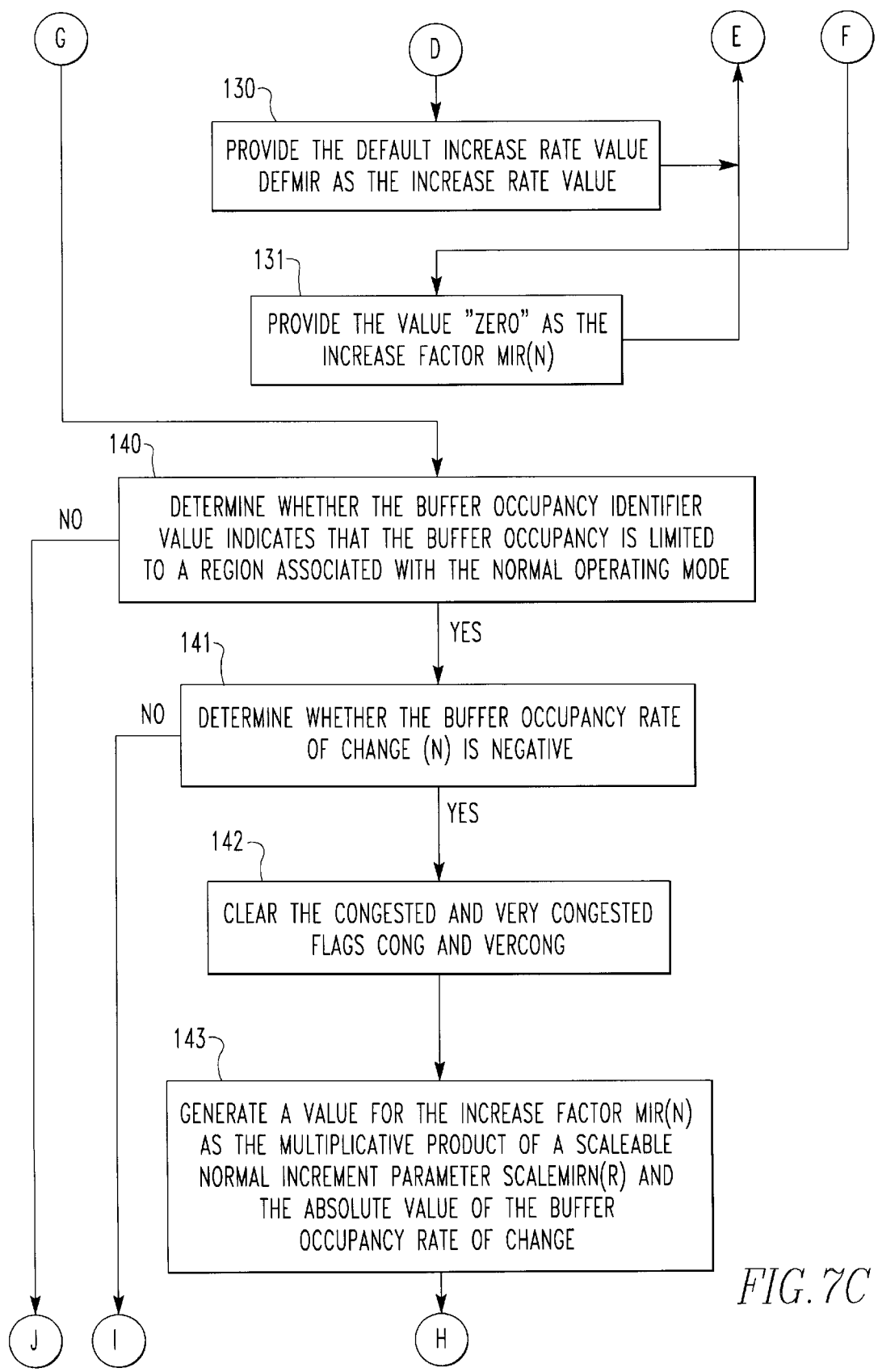
Figure 7D:
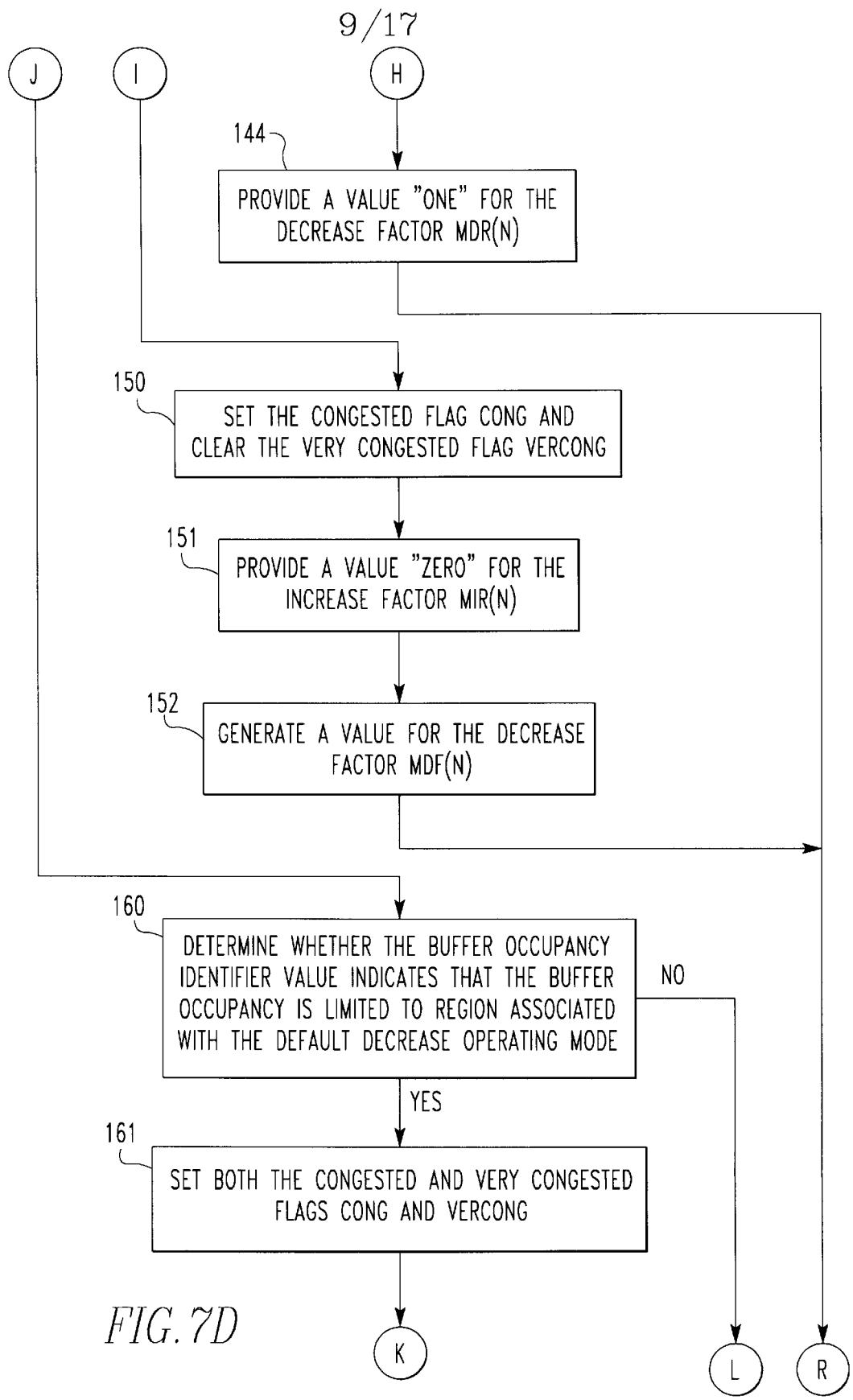
Figure 7E:
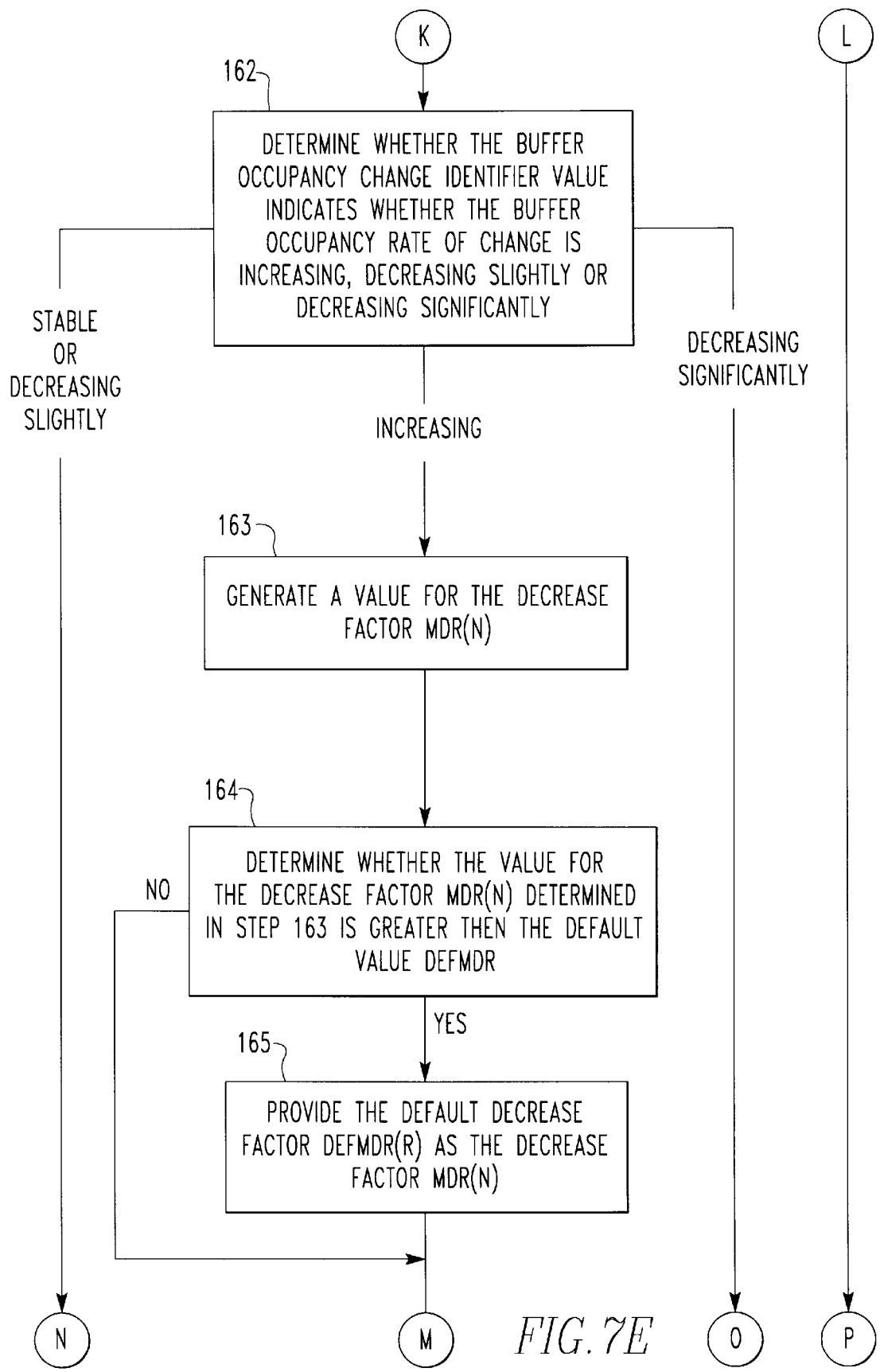
Figure 7F:
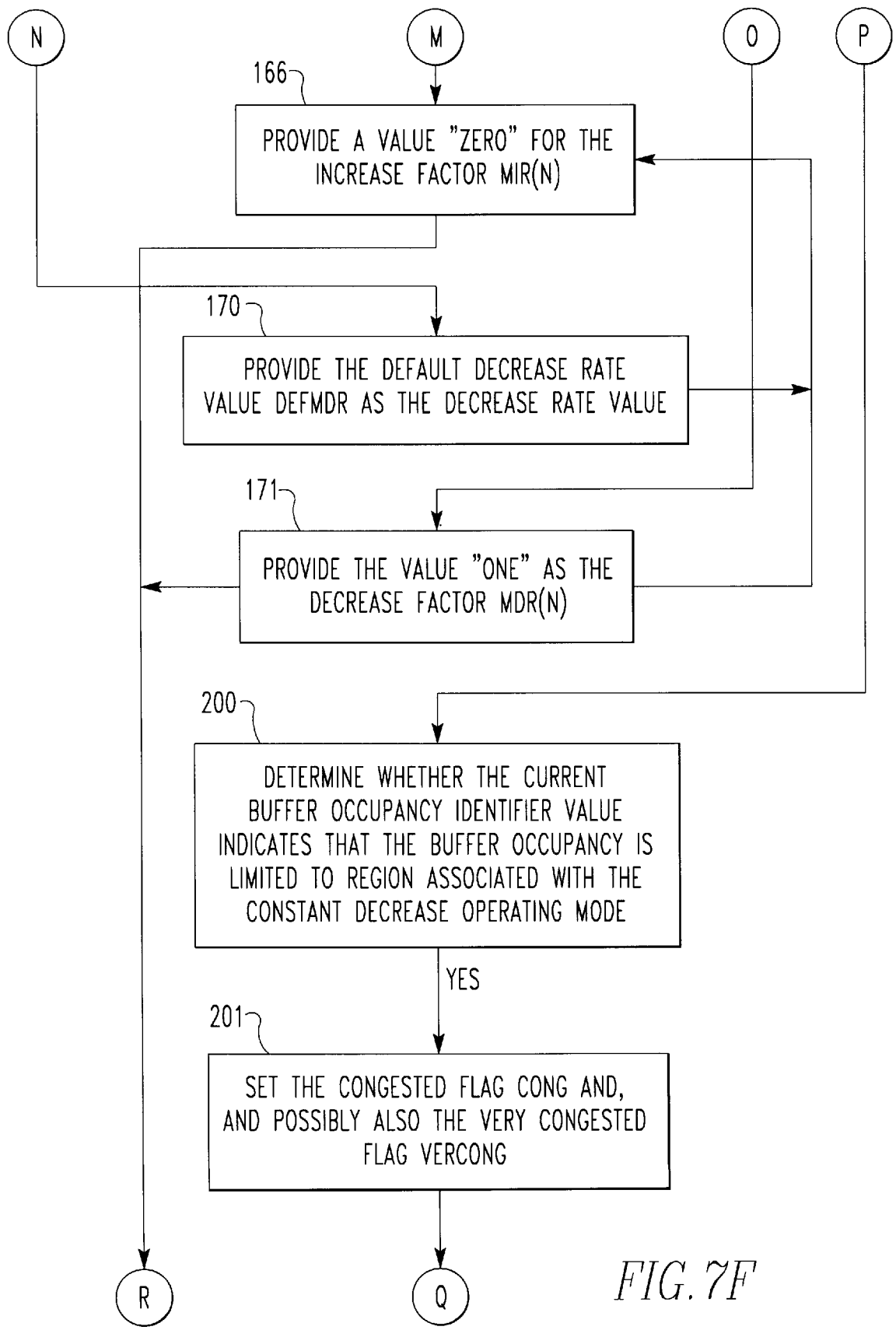
Figure 7G:
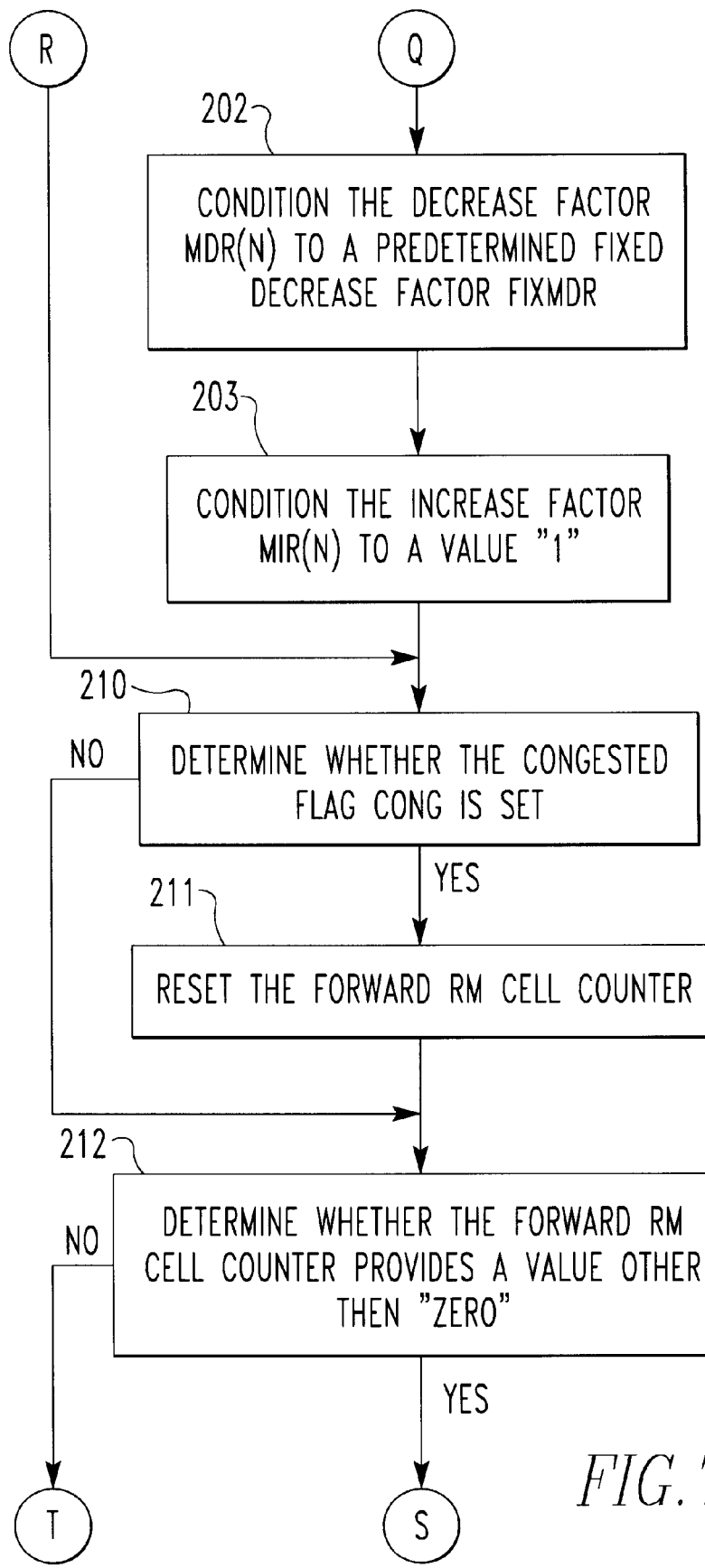
Figure 7H:
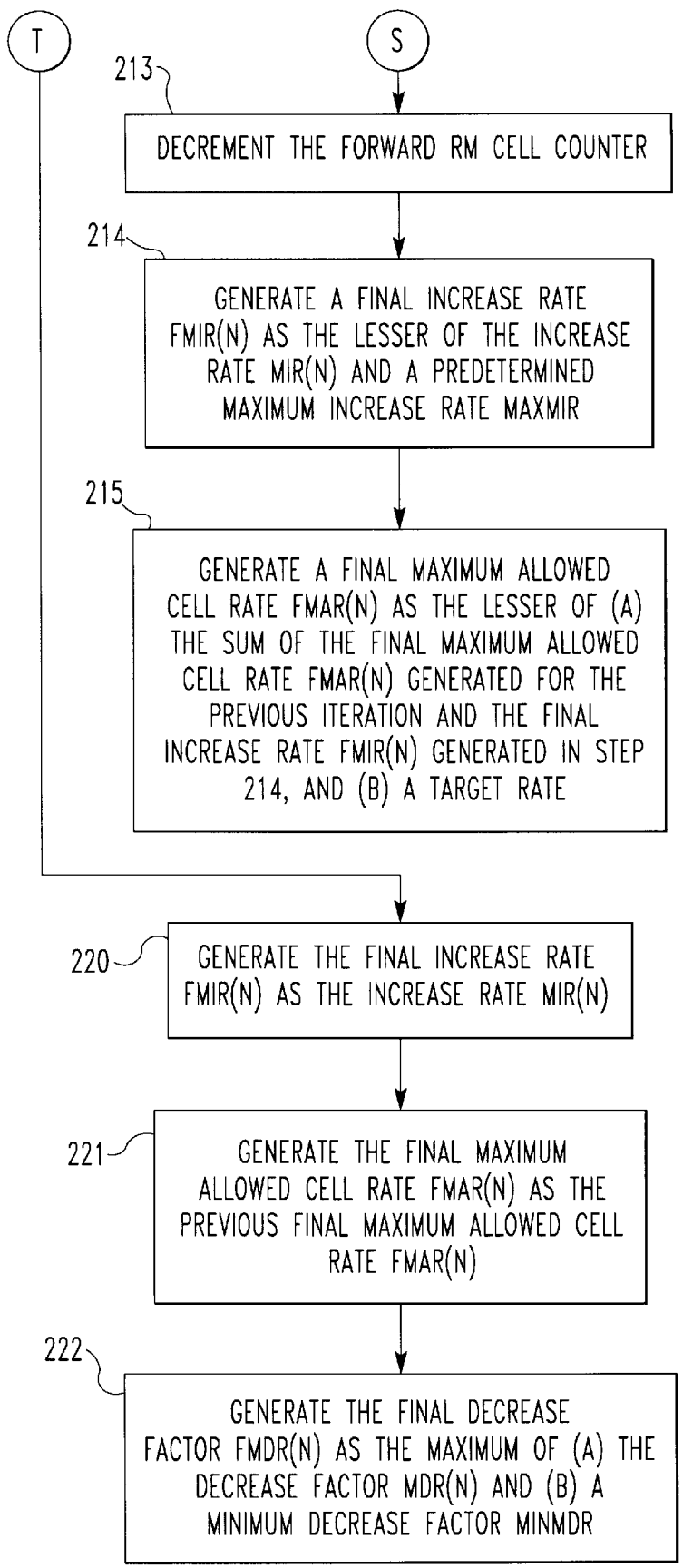
Figure 8:
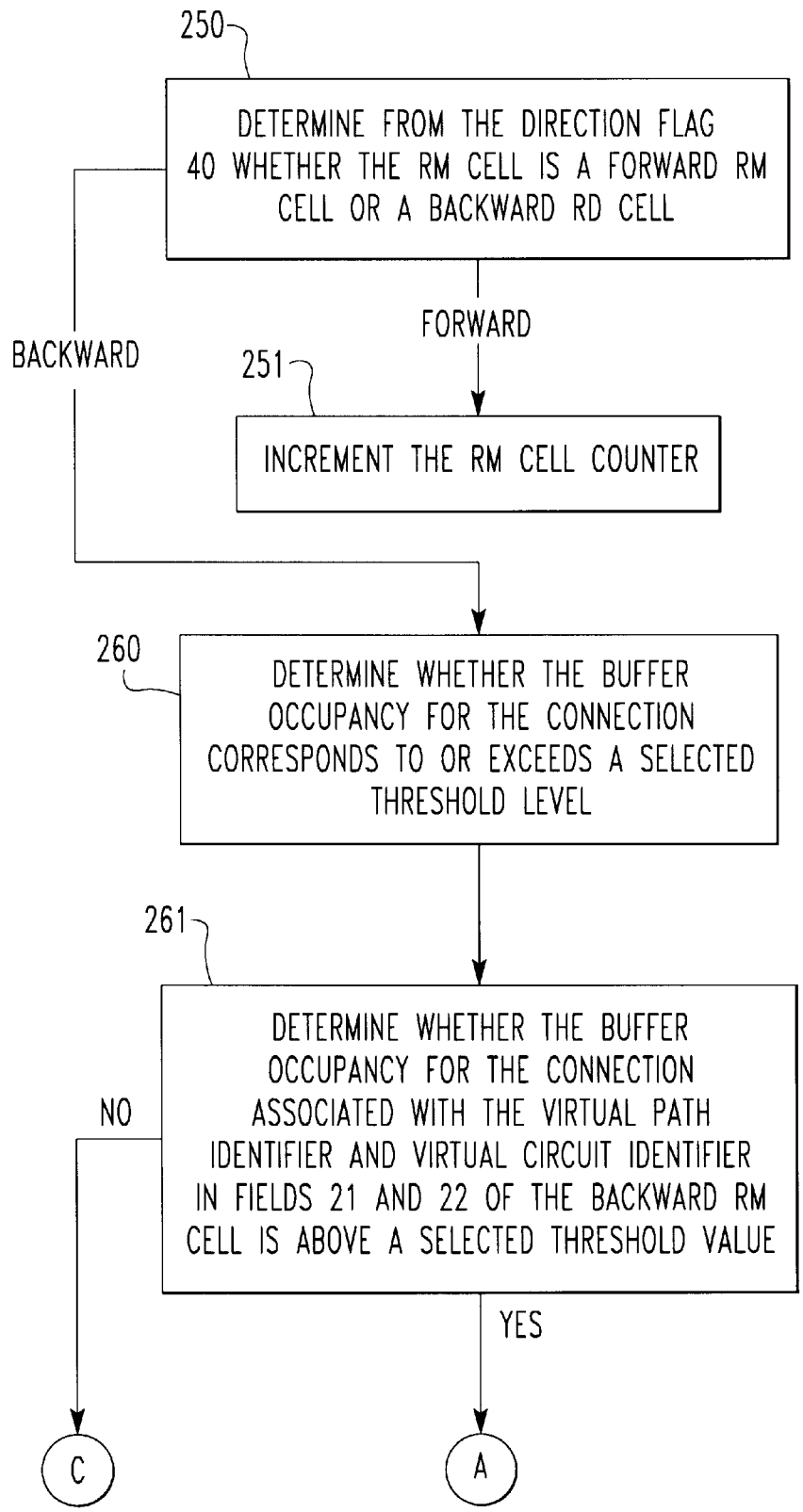
Figure 8A:
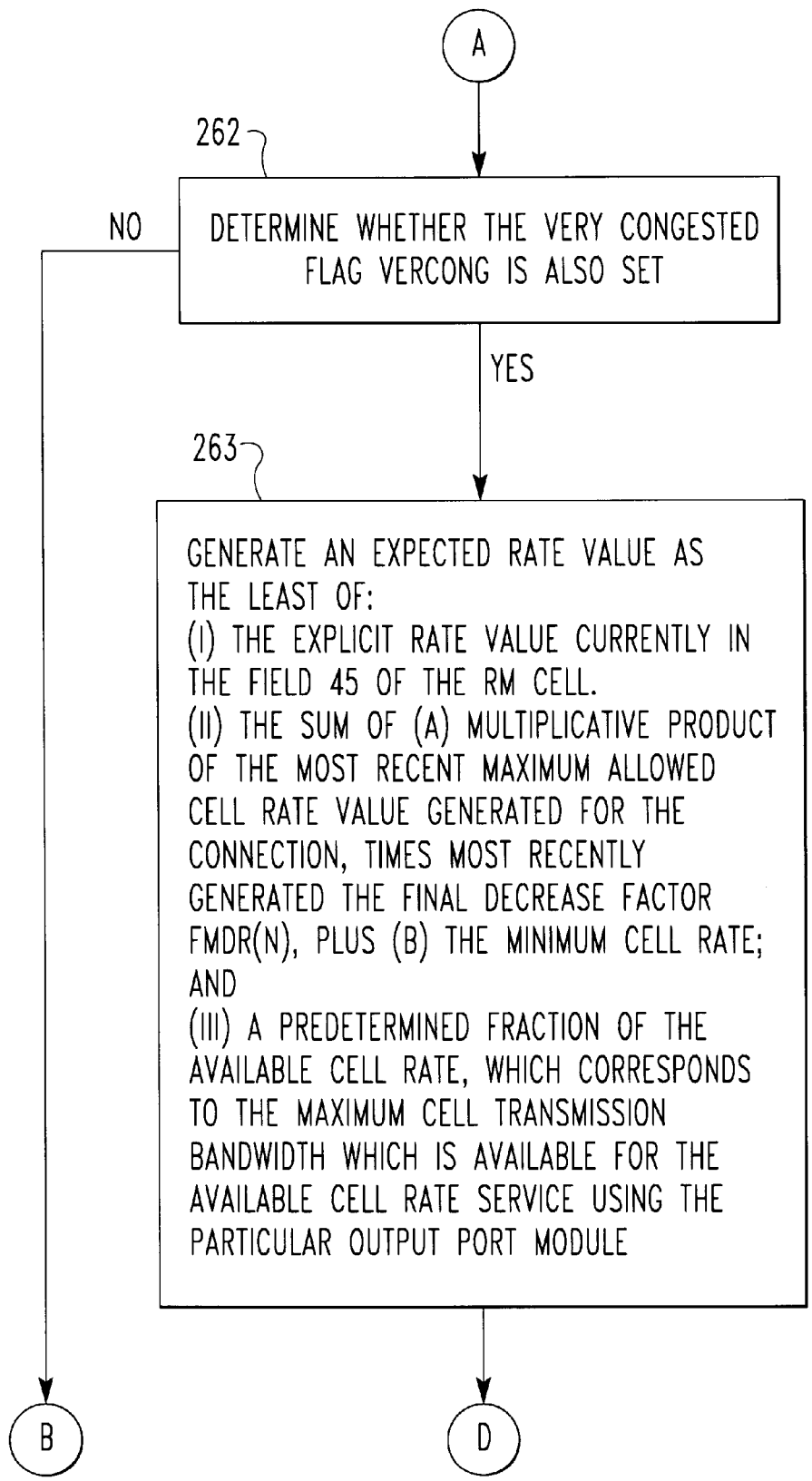
Figure 8B:
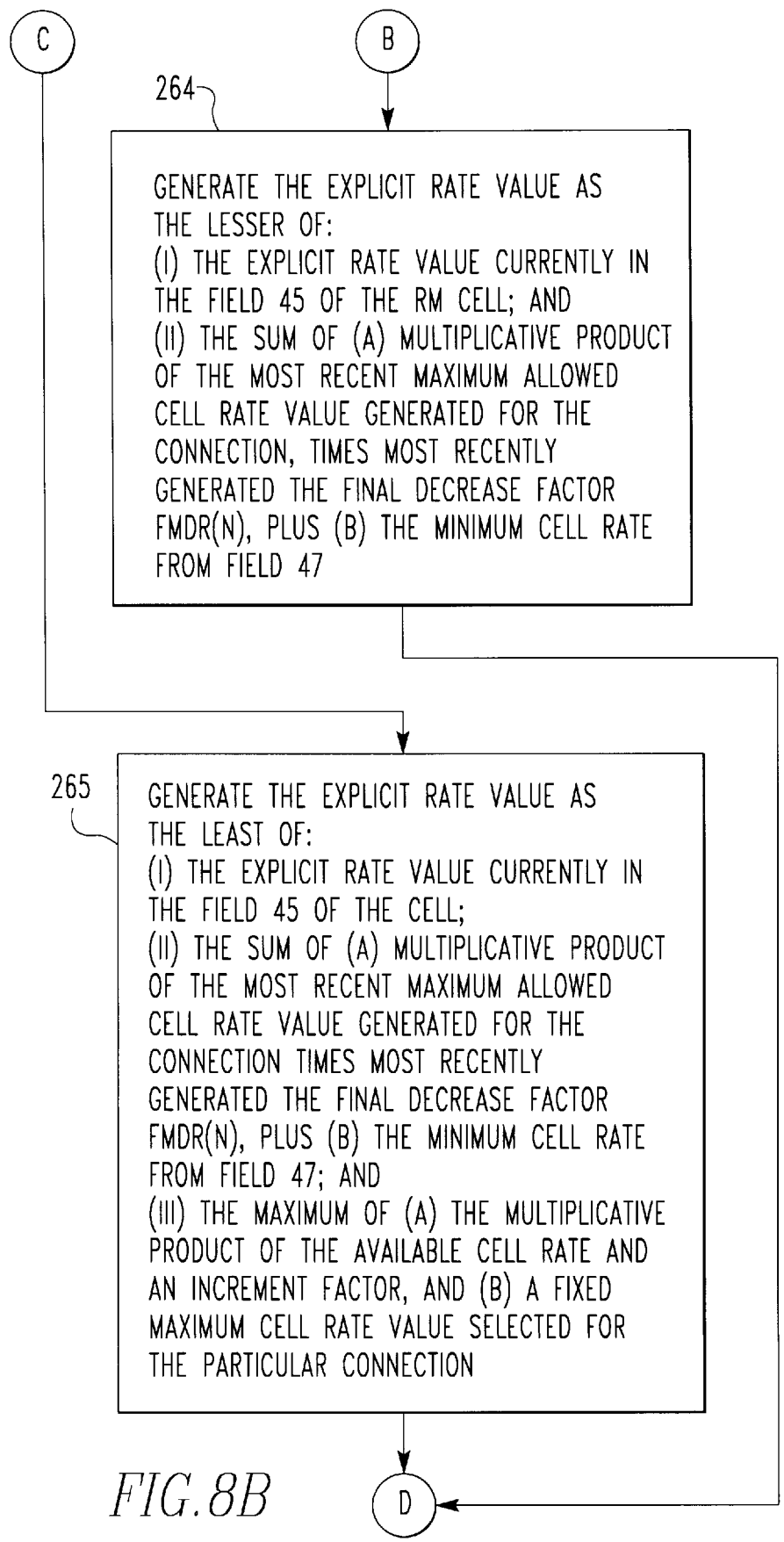
Figure 8C:
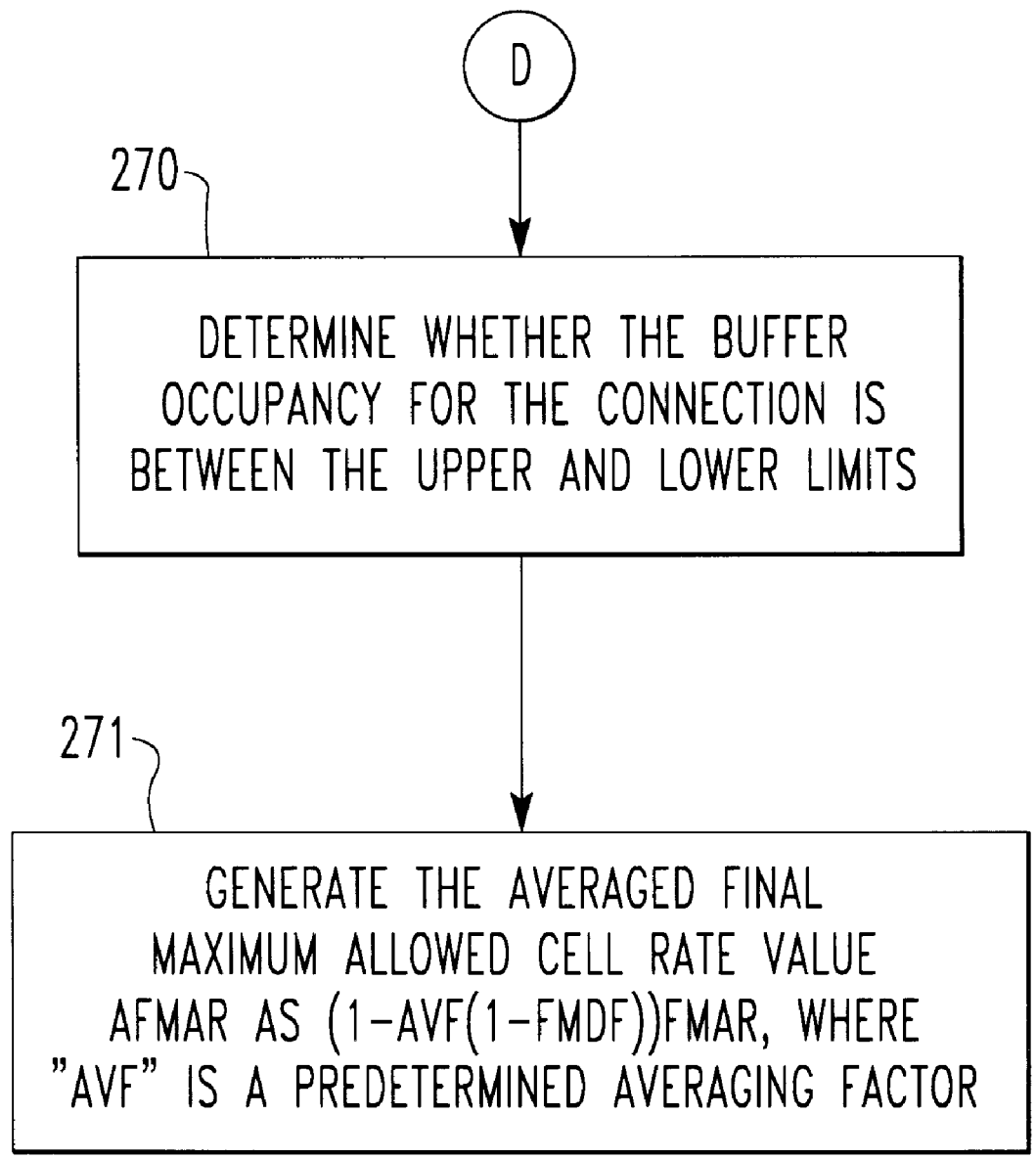

As indicated above, the RM cell information generator 85 generates information which is used in connection with backward RM cells, in particular in controlling the explicit rate value in field 45 (FIG. 4), as will be described in connection with FIGS. 6 through 8. FIG. 6 represents, in schematic form, the transmit cell buffer 82, in particular portions of the buffer 82 which are available for unregulated "available bit rate" service. Certain percentages of the buffer 82 may be allocated for buffering cells CELL(i) for connections for which service rates are guaranteed, while the remaining portions are allocated for buffering cells CELL(i) for connections which use the available bit rate services, and the schematic representation depicted in FIG. 6 is limited to the portion of the buffer 83 which are allocated for the connections which use the available bit rate services.

As is conventional, the transmit cell buffer 82 comprises a plurality of storage locations (not separately shown); in the embodiment depicted in FIG. 4, the buffer 82 is shown as comprising "B" storage locations extending from an output storage location "1" at an output end 90 depicted at the left end of the buffer 82 as shown in FIG. 4, to an input storage location "B" at an input end 91 depicted at the left end of the buffer 82. Cells are coupled to the buffer 82 from the input interface 60 over an input line 92 connected to the input end 91, and are drained from the buffer 82 through the output end 90 and transferred to the transmit interface 84 over an output line 93. In the representation depicted in FIG. 4, as a cell is loaded into the buffer 82 through the input end 85, it may be considered as being packed on top of previously-loaded undrained cells, and as each cell is drained from the buffer, the cell will be selected from picked from the rightmost cell in the buffer 82, that is, generally a cell CELL(i) which was buffered less recently.

The buffer 82, in particular the portion of the buffer allocated for available bit rate services, is divided into a plurality of regions which indicate the extent to which the buffer 82 is occupied with cells awaiting transmission. In the embodiment described herein, the buffer 82 is divided into five regions, identified as Region 1 through Region 5 in FIG. 6. That is, if the cell occupancy of the buffer is limited to region 1, only a small portion of the buffer 82 is occupied with cells CELL(i) awaiting transmission. On the other hand, if cell occupancy exceeds a low threshold value, represented by the dashed line identified by reference numeral 94, regions 1 and 2 are occupied with cells CELL(i) awaiting transmission, and so the buffer occupancy is somewhat higher. It will be appreciated that, if the cell occupancy at one point is limited to region 1 and at a later point extends also into region 2, the rate at which cells CELL(i) are being received is greater than the rate at which they are being transmitted for the period at those points in time.

Similarly, if the cell occupancy exceeds a low intermediate threshold value, represented by the dashed line identified by reference numeral 95, regions 1 through 3 are occupied with cells CELL(i) awaiting transmission, in which case the occupancy of buffer 82 will be still higher. Threshold levels are also defined by a high intermediate threshold value and a high threshold value, represented by dashed lines respectively identified by reference numerals 96 and 97, which define regions 4 and 5, respectively, representing increasing occupancy levels for the buffer 82. For each successive region 1 through 5, the occupancy level of the buffer increases.

It will be appreciated that, if at any given time the occupancy rate of the output port module's transmit cell buffer 82 is relatively low (illustratively in region 1), the buffer 82 will be able to buffer cells CELL(i) at an increasing rate, so the RM cell information generator 85 may generate rate control information for use in the RM cells 30 which may encourage the source computer systems $12(m_S)$ to transmit at a higher rate, subject to the rate limitations provided by other switching nodes along the connection(s) to respective destination computer systems $12(m_D)$. On the other hand, if the cell transmission rate through the output port module 31(p) reaches a point which is relatively high (illustratively in region 5), the RM cell information generator 85 may generate information for the RM cells which will preferably encourage the source computer systems $12(m_S)$ to transmit at a lower rate, to ensure that there is sufficient additional buffer space so that instantaneous short-term "spikes" in occupancy do not overflow the buffer 82.

In one embodiment, each of the regions may be associated with one of a plurality of operating modes, including, for example, a constant increase mode, a default increase mode, a normal operating mode, a default decrease mode and a constant decrease mode. In the constant increase mode, the rate control information which the RM cell information generator module 85 provides for the backward RM cells will preferably allow the source computer systems 12(mS) to increase their cell transmission rates to a relatively high, generally constant rate. In the default increase mode, the rate control information provided by the RM cell generator module 85 also allows the source computer systems 12(mS) to increase their cell transmission rates, but at a somewhat lower rate which will can decrease as the rate of change in the buffer occupancy increases. In one embodiment, in the default increase mode, (i) if the rate of change of the buffer occupancy is negative, that is, if the rate of change of the buffer occupancy is decreasing, the cell transmission rate increase will generally be a linear function of the rate of change of the buffer occupancy rate, so that the greater the decrease of the rate of change of the buffer occupancy, the higher the cell transmission rate can increase;

(ii) if the rate of change of the buffer occupancy is zero or slightly positive, that is, if the rate of change of the buffer occupancy is zero or increasing slowly, the cell transmission rate information will be generated as a function of a predetermined constant maximum cell transmission rate value; but (iii) if the rate of change of the buffer occupancy is more than slightly positive, that is, if the rate of change of the buffer occupancy is increasing more rapidly, the cell transmission rate increase is selected as zero, and a constant maximum allowed rate will be used in determining the cell transmission rate information for the backward RM cells.

Generally, the constant increase and default increase operating modes will be associated with buffer 82 operating in the sparsely-occupied regions, such as regions 1 and 2 (FIG. 6), to enable the source computer systems 12(mS) to increase their cell transmission rates so as to efficiently utilize the space in the buffer 82. Thus, for example, the sparsely-occupied region 1 may be associated with the constant increase mode, to enable the source computer systems 12(mS) to rapidly increase their cell transmission rates. Similarly, the more densely-occupied region 2 may be associated with the default increase mode, to enable the source computer systems 12(mS) to increase their cell transmission rates in a controlled fashion, which will decrease as the rate of change of the occupancy rate in region 2 increases.

Contrariwise in that same embodiment, in the constant decrease mode, the rate control information provided by the RM cell generator module 85 will require the source computer systems 12($m$S) to decrease their cell transmission rates at a relatively high, generally constant rate, and in the default decrease mode, the rate control information will require the source computer systems 12($m$S) to decrease their cell transmission rate at a somewhat lower rate which will increase as the rate of change of the buffer occupancy rate decreases. In one embodiment, in the default decrease mode, (i) if the rate of change of the buffer occupancy is positive, that is, if the rate of change of the buffer occupancy is increasing, the cell transmission rate decrease is generally a linear function of the rate of change of the buffer occupancy rate, so that the faster the increase of the buffer occupancy, the greater the decrease of the cell transmission rate.

(ii) if the rate of change of the buffer occupancy is zero or slightly negative that is, if the rate of change of the buffer occupancy is zero or decreasing slowly, the cell transmission rate information will be generated as a function of a predetermined constant maximum cell transmission rate decrease value, but (iii) if the rate of change of the buffer occupancy is more than slightly negative, that is, if the rate of change of the buffer occupancy is decreasing more rapidly, a predetermined maximum cell transmission rate decrease factor is used in determining the cell transmission rate information for the backward RM cells. In one embodiment, the predetermined maximum cell transmission rate decrease factor is selected to have the value "one."

Generally, the constant decrease and default decrease operating modes will be associated with buffer 82 operating in the densely-occupied regions, such as regions 5 and 4 (FIG. 6), to enable the source computer systems 12($m$S) to decrease their cell transmission rates so as to free space for instantaneous spikes and the like which can occur in cell traffic through the switching node 11($n$) and to facilitate accommodation of additional circuits which may be established therethrough. Thus, for example, the densely-occupied region 5 may be associated with the constant decrease mode, to enable the source computer systems 12($m$S) to rapidly decrease their cell transmission rates. Similarly, the somewhat more sparsely-occupied region 4 may be associated with the default decrease mode, to enable the source computer systems 12($m$S) to decrease their cell transmission rates in a controlled fashion, which will increase as the rate of change of the occupancy rate in region 4 decreases.

Finally, in the normal operating mode, the rate control information provided by the RM cell generator module 85 will enable the source computer systems 12($m$ S) to maintain their cell transmission rates at a relatively constant rate, by slowly decreasing the maximum allowed rate when the buffer occupancy is increasing, and slowly increasing the maximum allowed rate when the buffer occupancy is decreasing. In one embodiment, in the normal operating mode, (i) if the buffer occupancy rate is decreasing, the cell transmission rate information will be generated as a function of a maximum allowed rate, incremented by an increase factor which is a linear function of the rate of change of the buffer occupancy, and (ii) if the buffer occupancy rate is increasing, the cell transmission rate information will be generated as a function of a maximum allowed rate, decremented by an decrement factor which is a linear function of the rate of change of the buffer occupancy.

Generally, the normal operating mode will be associated with buffer 82 operating in a normal operational region, such as region 3 (FIG. 6).

It will be appreciated that, depending on a particular embodiment, there may be certain of the operating modes which are not associated with any of the regions. For example, in a particular embodiment, two or more of the regions may be associated with a single operating mode, so that, for example, the normal operating mode may be associated with both regions 3 and 4, and the default decrease operating mode may be associated with region 5. In such an embodiment, if the buffer occupancy falls in either of regions 3 and 4, the rate control information provided by RM cell generator module 85 will enable the source computer systems 12($m$S) to maintain their cell transmission rates at a relatively constant rate (consistent with the normal operating mode), whereas if the buffer occupancy rate increases to region 5 the rate control information may enable the source computer systems 12($m$S) to decrease their cell transmission rates in a controlled fashion, increasing as the occupancy rate in region 5 decreases (consistent with the default decrease operating mode). In such an embodiment, none of the regions may be associated with the constant decrease operating mode.

Similarly, in a particular embodiment, regions 2 and 3 may be associated with the normal operating mode, and the default increase operating mode may be associated with region 1. In such an embodiment, if the buffer occupancy falls in either of regions 2 and 3, the rate control information provided by RM cell generator module 85 will enable the source computer systems 12($m$S) to maintain their cell transmission rates at a relatively constant rate (consistent with the normal operating mode), whereas if the buffer occupancy rate decreases to region 1 the rate control information may enable the source computer systems 12($m$S) to increase their cell transmission rates in a controlled fashion, decreasing as the occupancy rate in region 1 decreases (consistent with the default increase operating mode). In such an embodiment, none of the regions may be associated with the constant increase operating mode.

As indicated above, the RM cell information generator 85 generates cell transmission rate information for the backward RM cells. In that operation, the RM cell information generator 85 performs two general operations. In one operation, the RM cell information generator 85 will maintain and periodically update statistics relating to the occupancy of buffer 82 (in particular, as described above, the percentage allowed for the available bit rate service) and whether and at what rate the buffer occupancy is increasing or decreasing, and in addition will generate values, generally identified herein as maximum allowed rate values and increase and decrease factors. In the other operation, when a backward RM cell is received, the RM cell information generator 85 generates an explicit rate value from the maximum allowed rate value, decrease factors and other information, which can be used in the backward RM cell. In one embodiment, the buffer 82 is allocated on a percommunications communications link basis, and so the RM cell information generator 85 actually maintains and updates the statistics for the portion of each buffer allocated to each communication link and generates separate cell transmission rate information for each communication link.

The periodic update interval is a selected multiple of the time interval at which the output port group 31(p) transmits cells CELL(i). In generating the cell transmission rate information, the RM cell information generator 85 will make use of several parameters, including the maximum allowed rate, and increase and decrease factor values as generally described above, and others which will be described below. In addition, the RM cell information generator 85 maintains a forward RM cell counter which controls the rate at which it (that is, the RM cell information generator 85) may increase the maximum allowed rate. Generally, the RM cell information generator 85 (i) increments the forward RM cell counter when a forward RM cell is received, (ii) decrements the forward RM cell counter when it adjusts the maximum allowed rate and (iii) zeroes the forward RM cell counter, thereby to preclude adjusting the maximum allowed rate, based on such criteria as whether the buffer occupancy is a selected level and whether the rate of change of buffer occupancy is increasing. The forward RM cell counter is provided to accommodate clustering of forward RM cells and to imitate a more regularly-spaced stream of forward RM cells, generally allowing the RM cell information generator 85 to update the maximum allowed rate and increase and decrease factors less often during periods in which forward RM cells are received at a relatively rapid rate, and more often during periods in which forward RM cells are received at a relatively slow rate. Accordingly, the RM cell information generator 85 will update the maximum allowed rate and increase and decrease factors with timings which are a function of both the update interval and the rate at which forward RM cells are received.

The operations performed by the RM cell information generator 85 in periodically updating the buffer occupancy statistics will be described in connection with the flow chart in FIG. 7, the operations performed in connection with generation of an explicit rate value will be described in connection with the flow chart in FIG. 8. With reference initially to FIG. 7, the RM cell information generator 85 will first initialize several variables, including a buffer occupancy identifier, a buffer occupancy rate of change identifier $\Delta(0)$ and the forward RM cell counter, which will be set to zero (step 100). In addition, the RM cell information generator 85 will initialize a maximum allowed rate value MAR(0) to correspond to a target rate value, which is a parameter that may be provided to the RM cell information generator 85 (step 101). A congested flag CONG and a very congested flag VerCONG are both initialized to indicate no congestion (step 102).

After the initialization step, the RM cell information generator 85 iteratively, at the end of each successive update time period, updates the buffer occupancy statistics and in addition updates the maximum allowed rate value MAR(n) and increment and decrement factor values MIR(n) and MDF(n), respectively. The maximum allowed rate value MAR(n) and increment and decrement factor values MIR(n) and MDF(n) will be used by the RM cell information generator 85 in generating an explicit rate value when needed for a backward RM cell, which, as indicated above corresponds to the cell rate information provided to the various source computer systems 12(m S).

More particularly, when the RM cell information generator 85 determines that an update time period has passed (step 110), it will sequence to step 111 to determine the current value of the buffer occupancy identifier for the buffer 82, and generate a new buffer occupancy change identifier $\Delta(n)$ as the difference between the current buffer occupancy identifier value and the prior buffer occupancy identifier value. The RM cell information generator 85 will also retain the current buffer occupancy identifier value as the buffer occupancy identifier value for the next iteration, for use in determining the buffer occupancy change identifier $\Delta(n+1)$ for that "n+1"st time period.

Thereafter, the RM cell information generator 85 will perform a set of operations to (i) adjust values for the increase and decrease factors MIR(n) and MDF(n) and to condition the congested and very congested flags CONG and VerCONG, and (ii) to update the RM cell counter and the maximum allowed rate MAR(n). The particular operations performed by the RM cell information generator 85 in connection with (i), that is, in connection with adjusting the values for the increase and decrease factors MIR(n) and MDF(n) will depend on the particular occupancy region 1 through 5 (FIG. 6) is indicated for the buffer 82 by the current buffer occupancy identifier value, and on the operational mode that is associated with each region. If the RM cell information generator 85 determines that the current buffer occupancy identifier value indicates that the occupancy is limited to region 1 (in particular, to any region associated with the constant increase operational mode) (step 112), it will reset the congested flag CONG and a very congested flag VerCONG (step 113), condition the increase factor MIR(n) to a predetermined fixed increase factor fixMIR, which will correspond to a parameter provided to the RM cell information generator 8, and condition the decrease factor MDF(n) to a value "1" (step 114).

Returning to step 112, if the RM cell information generator 85 determines in that step that the buffer occupancy identifier value indicates that the occupancy is not limited to region 1 (or any other region associated with the constant increase mode), it will sequence to step 120 to determine whether the current buffer occupancy identifier value indicates that the buffer occupancy is limited to region 2 (or any other region associated with the default increase mode). If so, the RM cell information generator 85 will initially clear both the congested and very congested flags CONG and VerCONG (step 121), and thereafter perform one or more steps to generate values for the increase and decrease factors MIR(n) and MDF(n) (step 121).

The specific operations performed by the RM cell information generator 85 in generating the values for the increase and decrease factors MIR(n) and MDF(n) will depend on whether the new buffer occupancy change identifier value $\Delta(n)$ indicates whether or not buffer occupancy rate of change $\Delta(n)$ is negative, that is, whether the buffer occupancy is decreasing, increasing slightly or increasing significantly, and the RM cell generator 85 will make an appropriate determination thereof in step 122. If the RM cell information generator 85 determines in step 122 that the buffer occupancy is decreasing (that is, if $\Delta(n)$ is less than zero), the RM cell generator 85 will generate an increase factor MIR(n) as the multiplicative product of a scalable increase factor for region two, scaleMIR(2), and the absolute value of the buffer occupancy rate of change $\Delta(n)$ (step 123), thereby to scale the increase factor MIR(n) in relation to the rate at which the buffer occupancy is decreasing. Thereafter, to ensure that the increase factor MIR(n) is not less than a default increase factor for the region, the RM cell generator 85 determines whether the value for the increase factor MIR(n) determined in step 122 is less than a default increase factor value defMIR for the region (step 124) and if so provides the default increase factor defMIR as the increase factor MIR(n) (step 125). Following step 125, or step 124 if it makes a negative determination in that step, the RM cell information generator 85 will provide a value "one" for the decrease factor MDF(n) (step 126).

Returning to step 121, if the RM cell information generator 85 determines in that step that the buffer occupancy rate of change Δ(n) is stable or increasing slightly, it will sequence to step 130, in which it will provide the default increase rate value defMIR as the increase rate value. Following step 130, the RM cell information generator 85 will sequence to step 125 to provide the value "one" for the decrease factor MDF(n).

Again returning to step 121, if the RM cell information generator determines in that step that the buffer occupancy rate of change Δ(n) is increasing significantly, it will sequence to step 131, in which it will provide the value "zero" as the increase factor MIR(n). Following step 131, the RM cell information generator 85 will sequence to step 125 to provide the value "one" for the decrease factor MDF(n).

Returning to step 120, if the RM cell information generator 85 determines in that step that the current buffer occupancy identifier value indicates that the buffer occupancy is not limited to region 2 (or any other region associated with the default increase mode), it will sequence to step 140 to determine whether it (that is, the current buffer occupancy identifier value) indicates that the buffer occupancy is limited to region 3 (or any other region associated with the normal operating mode). If the RM cell information generator 85 makes a positive determination in step 140, it will initially determine whether the buffer occupancy rate of change Δ(n) is negative (in which case the buffer occupancy is decreasing) or zero or positive (in which case the buffer occupancy is stable or increasing) (step 141). If the RM cell information generator 85 makes a positive determination in step 141, that is, if it determines that the buffer occupancy rate of change Δ(n) is negative, it will clear the congested and very congested flags CONG and VerCONG (step 142) and generate a value for the increase factor MIR(n) as the multiplicative product of a scalable normal increment parameter scaleMIRn(r) and the absolute value of the buffer occupancy rate Δ(n) (step 143). The particular value which is selected for of the scalable normal increment parameter scaleMIRn(r) may differ as among the various regions "r" which may be associated with the normal operating mode. In addition, the RM cell information generator 85 will provide a value "one" for the decrease factor MDF(n) (step 144)

Returning to step 141, if the RM cell generator module 85 makes a negative determination in that step, that is, if it determines that the buffer occupancy rate of change Δ(n) is zero or positive, it will sequence to a series of steps beginning with step 150. Initially, the RM cell generator module 85 will set the congested flag CONG and clear the very congested flag VerCONG (step 150). Thereafter, the RM cell generator module 85 will provide a value "zero" for the increase factor MIR(n) (step 151) and proceed to step 152 to generate a value for the decrease factor MDF(n) as 1—scaleMDFn(r)|Δ(n)|, where "|Δ(n)|" refers to the absolute value of "Δ(n)" and scaleMDFn(r) is a scalable normal decrease parameter whose value may differ as among the various regions "r" which may be associated with the normal operating mode.

Returning to step 140, if the RM cell information generator 85 determines in that step that the current buffer occupancy identifier value indicates that the buffer occupancy is not limited to region 3 (or any other region associated with the normal operating mode), it will determine whether the current buffer occupancy identifier value indicates that the buffer occupancy is limited to region 4 (or any other region associated with the default decrease operating mode) (step 160). If so, the RM cell information generator 85 will initially set both the congested and very congested flags CONG and VerCONG (step 161), and thereafter perform one or more steps to generate values for the increase and decrease factors MIR(n) and MDF(n).

The specific operations performed by the RM cell information generator 85 in generating the values for the increase and decrease factors MIR(n) and MDF(n) will depend on whether the new buffer occupancy change identifier value Δ(n) indicates whether or not the buffer occupancy rate change is positive, that is, whether the buffer occupancy rate of change Δ(n) is increasing, decreasing slightly or decreasing significantly, and the RM cell generator 85 will make an appropriate determination thereof in step 162. If the RM cell information generator 85 determines in step 162 that the buffer occupancy is increasing (that is, if Δ(n) is greater than zero), it (the RM cell generator 85) will generate a decrease factor MDF(n) as "1—scaleMDFdd(r) |Δ(n)|", where, as above, |Δ(n)| refers to the absolute value of "Δ(n)" and scaleMDFdd(r) is a scalable default decrease parameter whose value may differ as among the various regions "r" which may be associated with the default decrease operating mode (step 163), thereby to scale the decrease factor MDF (n) in relation to the rate at which the buffer occupancy is increasing. Thereafter, to ensure that the decrease factor MDF(n) is not greater than a default decrease factor defMDF, the RM cell generator 85 determines whether the value for the decrease factor MDF(n) determined in step 163 is greater than the default value defMDF (step 164) and if so provides the default decrease factor defMDF(r) (whose value may also differ as among the various regions "r") the decrease factor MDF(n) (step 165). In addition, the RM cell information generator 85 will provide a value "zero" for the increase factor MIR(n) (step 166)

Returning to step 162, if the RM cell information generator 85 determines in that step that the buffer occupancy rate of change Δ(n) is stable or decreasing slightly, it will sequence to step 170, in which it will provide the default decrease rate value defMDF as the decrease rate value. Following step 170, the RM cell information generator 85 will sequence to step 166 to provide the value "zero" for the increase factor MIR(n)

Again returning to step 162, if the RM cell information generator 85 determines in that step that the buffer occupancy rate of change Δ(n) is decreasing significantly, it will sequence to step 171, in which it will provide the value "one" as the decrease factor MDF(n). Following step 171, the RM cell information generator 85 will sequence to step 166 to provide the value zero" for the increase factor MIR(n).

Returning to step 160, if the RM cell information generator 85 determines in that step that the current buffer occupancy identifier value indicates that the buffer occupancy is not limited to region 4 (or any other region associated with the default decrease operating mode), it will determine whether the current buffer occupancy identifier value indicates that the buffer occupancy is limited to region 5 (or any other region associated with the constant decrease operating mode) (step 200). If the RM cell information generator 85 determines in step 200 that the current buffer occupancy identifier value indicates that the occupancy is limited to region 5 (or any region associated with the constant increase operational mode), it will set the congested flag CONG and, and may also set the very congested flag VerCONG (step 201), condition the decrease factor MDF(n) to a predetermined fixed decrease factor fixMDF (step 202), which will correspond to a parameter provided to the RM cell information generator 85, and condition the increase factor MIR(n) to a value "1" (step 203).

After conditioning the congested and very congested flags CONG and VerCONG, and generating the increase and decrease factors MIR(n) and MDF(n) in steps 112 through 203, the RM cell information generator 85 will sequence to a series of steps to condition the forward RM cell counter, and generate final maximum allowed rate fMAR and final increase and decrease factors fMIR(n) and fMDF(n) for the iteration, which will be used in generating cell rate information if a backward RM cell is received before these values are updated in a subsequent iteration. Initially, the RM cell information generator 85 will determine whether the congested flag CONG is set (step 210), and if so will reset the forward RM cell counter (step 211). As described above, the congested flag CONG will be set if the RM cell information generator 85 determined (i) in step 150 if the buffer occupancy was associated with the normal operating mode and the occupancy rate was stable or increasing, and (ii) in steps 161 and 201 if the buffer occupancy was associated with the default decrease and constant decrease modes, and thus the buffer 82 was generally densely occupied.

Following step 211, or following step 210 if the RM cell information generator 85 determines in that step that the congested flag CONG is not set, it (the RM cell information generator 85) will sequence to step 212). In step 212, the RM cell information generator 85 will determine whether the forward RM cell counter provides a value other than "zero." If the RM cell information generator makes a positive determination in step 212, it (that is, the RM cell information generator 85) will (i) decrement the forward RM cell counter (step 213),
(ii) generate a final increase rate fMIR(n) as the lesser of the increase rate MIR(n) and a predetermined maximum increase rate maxMIR, which corresponds to a parameter value provided to the RM cell information generator 85 (step 214), and
(iii) generate a final maximum allowed rate fMAR(n) as the lesser of (a) the sum of the final maximum allowed rate fMAR(n−1) generated for the previous iteration and the final increase rate fMIR(n) generated in step 214, and (b) a target rate (step 215).

Returning to step 212, if the RM cell information generator 85 determines in step 212 that the forward RM cell counter provides a value "zero," it (that is, the RM cell information generator 85) will generate the final increase rate fMIR(n) as the increase rate MIR(n) (step 220) and the final maximum allowed rate fMAR(n) as the final maximum allowed rate fMAR(n−1) generated for the previous iteration (step 221). Following either step 215 or step 221, the RM cell information generator 85 will generate the final decrease factor fMDF(n) as the maximum of (a) the decrease factor MDF(n) and (b) a minimum decrease factor minMDF, which corresponds to a parameter value provided to the RM cell information generator 85 (step 222).

As indicated above, the RM cell information generator 85, when the RM cell stamping unit 86 receives a backward RM cell for a connection, will use the most recent maximum allowed rate value MAR(n) and final decrease factor fMDF(n) that it had generated, along with the values of several parameters, to generate an explicit rate value for field 45 for the backward RM cell. Operations performed by the RM cell information generator 85 in connection with generation of an explicit rate value are depicted in the flow chart in FIG. 8. With reference to FIG. 8, when an RM cell, the RM cell information generator 85 will initially determine from the direction flag 40 whether the RM cell is a forward RM cell or a backward RM cell (step 250). If the RM cell information generator 85 determines that the RM cell is a forward RM cell, it will increment the RM cell counter (step 251), and return to step 250.

On the other hand, if the RM cell information generator 85 determines in step 250 that the direction flag 40 indicates that the RM cell is a backward RM cell, it will sequence to a series of steps to generate the explicit rate value for field 45 of the RM cell. Generally, if the buffer occupancy rate is relatively high, in determining an explicit rate value for field 45 of an RM cell that is associated with a particular connection, among a number of connections serviced by the particular output port module 61(p), the RM cell information generator 85 will consider the resources which are devoted to the particular connection, which, in turn, so as to permit generally equal sharing of the resources among all of the connections serviced by the output port module 61(p). This, in turn, is generally related to the portion of the buffer 82, in particular the portion devoted to the available bit rate service, which is occupied by cells for the particular connection. Thus, if (i) the very congested flag VerCONG is set, which will be the case if the buffer occupancy rate is in a region associated with the default decrease or constant decrease operational mode, and
(ii) the portion of buffer 82 occupied by cells for the connection associated with the backward RM cell is above a selected threshold value, the explicit rate value provided by RM cell information generator 85 will be bounded by a value which will attempt to reduce the cell transmission rate for the connection. On the other hand, if the portion of buffer 82 occupied by cells for the connection is below the selected threshold value, the RM cell information generator 85 can provide a higher value. In any case, the explicit rate value provided by the RM cell information generator 85 will not provide for faster cell transmission over the connection than is provided by the explicit rate value in the backward RM cell.

More specifically, and returning to step 250, if the RM cell information generator 85 determines in that step that the direction flag indicates that the RM cell is a backward RM cell, it will sequence to step 260 to determine whether the buffer occupancy for the connection corresponds to or exceeds a selected threshold level. If the RM cell information generator 85 makes a positive determination in step 260, it will determine whether the buffer occupancy for the connection associated with the virtual path identifier and virtual circuit identifier in fields 21 and 22 of the backward RM cell (FIG. 4) is above a selected threshold value (step 261). If the RM cell information generator 85 makes a positive determination in step 261, it will determine whether the very congested flag VerCONG is also set (step 262). If the RM cell information generator 85 makes a positive determination in step 262, it will generate an expected rate value for inclusion in field 45 of the backward RM cell (step 263) as the least of:

(i) the explicit rate value currently in the field 45 of the backward RM cell (to ensure that, if the destination computer system $12(m_D)$ or a switching node $11(n)$ downstream along the path from the source computer system $12(m_S)$ to the destination computer system $12(m_D)$ has provided lower rate, that lower rate will not be overwritten);
(ii) the sum of (a) multiplicative product of the most recent maximum allowed rate value generated for the connection, times most recently generated the final decrease factor fMDF(n), plus (b) the minimum cell rate from field 47 of the backward RM cell; and
(iii) a predetermined fraction of the available cell rate, which corresponds to the maximum cell transmission bandwidth which is available for the available cell rate service using the particular output port module 61(*p*). In one embodiment, the fraction is selected to be one-half Returning to step 262, if the RM cell information generator determines in that step that the very congested flag VerCONG is not set, it will sequence to step 264 to generate the explicit rate value as the lesser of (i) the explicit rate value currently in the field 45 of the RM cell (to ensure that, if the destination computer system 12($m_S$) or a switching node 11(*n*) downstream along the path from the source computer system 12($m_S$) to the destination computer system 12($m_D$) has provided lower rate, that lower rate will not be overwritten); and (ii) the sum of (a) multiplicative product of the most recent maximum allowed rate value generated for the connection, times most recently generated the final decrease factor fMDF(n), plus (b) the minimum cell rate from field 47 of the backward RM cell.

Returning to step 261, if the RM cell information generator determines in that step that the buffer occupancy rate for the connection associated with the virtual path identifier and virtual circuit identifier in fields 21 and 22 of the backward RM cell (FIG. 4) is below a selected threshold value, it will sequence to step 265 to generate the explicit rate value as the least of:

(i) the explicit rate value currently in the field 45 of the backward RM cell (to ensure that, if the destination computer system 12($m_D$) or a switching node 11(*n*) downstream along the path from the source computer system 12($m_S$) to the destination computer system 12($m_D$) has provided lower rate, that lower rate will not be overwritten);

(ii) the sum of (a) multiplicative product of the most recent maximum allowed rate value generated for the connection, times most recently generated the final decrease factor fMDF(n), plus (b) the minimum cell rate from field 47 of the backward RM cell; and (iii) the maximum of (a) the multiplicative product of the available cell rate and an increment factor, and (b) a fixed maximum cell rate value selected for the particular connection.

The increment factor used in (iii) may differ as among connections using various types of networks, such as wide area networks (WANs) and local area networks (LANs). Since the time required for a forward RM cell transmitted by a source computer system 12(*m*S) to return as a backward RM cell in a WAN may be significantly longer than in a LAN, which, in turn, can result in longer delays in notifying source computer systems 12(*m*S) that they are to reduce their cell transmission rates in WANs than in LANs, it may be desirable to limit the rates of increase for cell transmission rates in a WAN environment to a greater degree than in a LAN environment, in which case the increment factor may be selected to be lower in a WAN environment than in a LAN environment.

Finally, following steps 263, 264 or 265, the RM cell information generator 85 sequences to a series of steps 270 and 271 in which may generate an averaged final maximum allowed rate value afMAR, which will provide that the final maximum allowed rate does not change too rapidly. The averaged final maximum allowed rate value afMAR will be used subsequently as the maximum allowed rate MAR and the final maximum allowed rate fMAR in connection with operations performed in updating the maximum allowed rate value MAR and increase and decrease factors MIR and MDF (FIG. 7) and in generating an expected rate value (FIG. 8) if the maximum allowed rate MAR is not adjusted in accordance with operations described in FIG. 8 in the meantime. The RM cell information generator 85 will, however, do this only if the connection is reasonably well behaved, that is, if its buffer occupancy rate is between selected upper and lower limits, which are respectively above and below the threshold value used in steps 263, 264 and 265 above. Accordingly, in step 270, the RM cell information generator 85 will determine whether the buffer occupancy for the connection is between the upper and lower limits, and, if so, will proceed to step 271 to generate the averaged final maximum allowed rate. In step 271, the RM cell information generator 85 generates the averaged final maximum allowed rate value afMAR as (1-AVF(1-fMDF))fMAR, where "AVF" is a predetermined averaging factor.

The invention provides a number of advantages. In particular, it provides an arrangement for quickly generating explicit rate and congestion information for inclusion in a backward RM cell, to provide cell transmission rate information to a source computer system 12($m_S$).

It will be appreciated that a number of modifications may be made to the invention described above in connection with FIGS. 1 through 8. For example, the number of cell occupancy regions for use in connection with the buffer 82 may be more or less than five. In addition, the number of operational modes may be more or less than five and their associations with the various cell occupancy regions may vary from that described herein. Indeed, the number of regions and operational modes associated therewith may be so large as to provide that the explicit rate is effectively a continuous function of the buffer occupancy and the the buffer occupancy's rate of change. Furthermore, where the buffer 82 is divided into discrete regions, the values for the buffer occupancy thresholds (illustratively the four thresholds identified by reference numerals 94 through 97) defining the various regions may divide the buffer 82 into regions of equal or unequal sizes. In addition, it will be appreciated that the values of the various parameters, including in particular the mean additive increment rate parameter, the mean reduction factor parameter, the scalable increase and decrease factors may differ as among the various buffer occupancy regions 1 through 5 to ensure that the flow control "explicit rate" information will provide that the various source computer system will not transmit at a rate that may cause the buffer 82 to overflow.

It will further be appreciated that a system in accordance with the invention can be constructed in whole or in part from special purpose hardware or a general purpose microprocessor, or any combination thereof, any portion of which may be controlled by a suitable program.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A resource management cell information generator for use in connection with a switching node for a digital network, said digital network including a source device and a destination device, said source device generating cells for transmission at a selected transmission rate to said destination device over a path through said switching node to transmit data in a downstream direction from said source device to said destination device, said source device further periodically generating resource management cells for transmission to said destination device over said path in said downstream direction, said destination device returning said resource management cells through said switching node to said source device, said switching node including a buffer for buffering cells transmitted in said downstream direction, a cell receiver for receiving cells from said digital network and buffering the received cells in said buffer, a cell transmitter for transmitting cells buffered in said buffer, said resource management cell information generator generating flow control information for inclusion in resource management cells to be transmitted by said cell transmitter, said resource management cell information generator including:

a periodic statistic generator having a current buffer occupancy identifier variable having a value associated with the cell occupancy of said buffer at a current time, a prior buffer occupancy identifier variable having a value associated with the cell occupancy of said buffer at a prior time to the current time and a buffer occupancy rate of change identifier variable having a value, said buffer occupancy rate of change identifier value being a difference between said current buffer occupancy identifier value and said prior buffer occupancy identifier value, said periodic statistic generator for periodically updating a maximum allowed cell rate value as a function of said buffer occupancy rate of change identifier value; and a flow control rate generator for generating said flow control information for inclusion in a resource management cell buffered in said buffer, said flow control rate generator generating said flow control information in relation to said maximum allowed cell rate value most recently generated by said periodic statistic generator and an adjustment factor value generated in relation to changes in said buffer occupancy.

2. A resource management cell information generator as defined in claim 1 in which said buffer is divided into a plurality of cell occupancy regions, each associated with one of a plurality of operational modes, the periodic statistic generator updating said maximum allowed rate value in relation to the operational mode associated with the buffer's cell occupancy region when the maximum allowed rate value is updated.

3. A resource management cell information generator as defined in claim 2 in which one operational mode is a constant increase mode, the flow control rate generator updating the maximum allowed rate value as a previous maximum allowed rate value plus a predetermined increment rate value if the buffer's cell occupancy region is associated with said constant increase mode.

4. A resource management cell information generator as defined in claim 3 in which one cell occupancy region is a sparsely occupied region, in which the buffer is sparsely occupied, the constant increase mode being associated with said sparsely-occupied region.

5. A resource management cell information generator as defined in claim 3 in which said flow control rate generator further updates said maximum allowed rate in relation to a selected target rate value.

6. A resource management cell information generator as defined in claim 3 in which said flow control rate generator further updates said maximum allowed rate in relation to a minimum cell rate value identified in a resource management cell.

7. A resource management cell information generator as defined in claim 2 in which one operational mode is a default increase mode, the flow control rate generator updating the maximum allowed rate value in relation to a previous maximum allowed rate value and an adjustment factor determined in relation to a rate of change of the buffer occupancy.

8. A resource management cell information generator as defined in claim 7 in which one cell occupancy region is a low intermediate occupied region, the default increase mode being associated with said low intermediate occupied region.

9. A resource management cell information generator as defined in claim 7 in which the periodic statistic generator generates a buffer occupancy rate of change value identifying the rate of change of buffer occupancy and the flow control rate generator updates the maximum allowed rate in relation to a scale factor and the buffer occupancy rate of change value if the buffer occupancy rate of change value is negative.

10. A resource management cell information generator as defined in claim 7 in which the periodic statistic generator generates a buffer occupancy rate of change value identifying the rate of change of buffer occupancy and the flow control rate generator updates the maximum allowed rate in relation to a default increase value if the buffer occupancy rate of change value is slightly positive.

11. A resource management cell information generator as defined in claim 7 in which the periodic statistic generator generates a buffer occupancy rate of change value identifying the rate of change of buffer occupancy and the flow control rate generator does not update the maximum allowed rate if the buffer occupancy rate of change value is significantly positive.

12. A resource management cell information generator as defined in claim 7 in which said flow control rate generator further updates said maximum allowed rate in relation to a selected target rate value.

13. A resource management cell information generator as defined in claim 7 in which said flow control rate generator further updates said maximum allowed rate in relation to a minimum cell rate value identified in a resource management cell.

14. A resource management cell information generator as defined in claim 2 in which one operational mode is a normal mode, the periodic statistic generator updating the maximum allowed rate value in relation to a previous maximum allowed rate value and an adjustment factor determined in relation to a rate of change of the buffer occupancy.

15. A resource management cell information generator as defined in claim 14 in which one cell occupancy region is an intermediate occupied region, the default increase mode being associated with said intermediate occupied region.

16. A resource management cell information generator as defined in claim 14 in which the periodic statistic generator generates a buffer occupancy rate of change value identifying the rate of change of buffer occupancy and the flow control rate generator updates the maximum allowed rate in relation to a scale factor and the buffer occupancy rate of change value if the buffer occupancy rate of change value is negative.

17. A resource management cell information generator as defined in claim 14 in which the periodic statistic generator generates a buffer occupancy rate of change value identifying the rate of change of buffer occupancy and the flow control rate generator does not update the maximum allowed rate if the buffer occupancy rate of change value is positive.

18. A resource management cell information generator as defined in claim 2 in which one operational mode is a default decrease mode, the flow control rate generator updating the maximum allowed rate value in relation to a previous maximum allowed rate value and an adjustment factor determined in relation to a rate of change of the buffer occupancy.

19. A resource management cell information generator as defined in claim 18 in which one cell occupancy region is a densely occupied region, the default decrease mode being associated with said densely occupied region.

20. A resource management cell information generator as defined in claim 18 in which the periodic statistic generator generates a buffer occupancy rate of change value identifying the rate of change of buffer occupancy and the flow control rate generator updates the maximum allowed rate in relation to a scale factor and the buffer occupancy rate of change value if the buffer occupancy rate of change value is positive.

21. A resource management cell information generator as defined in claim 18 in which the periodic statistic generator generates a buffer occupancy rate of change value identifying the rate of change of buffer occupancy and the flow control rate generator updates the maximum allowed rate in relation to a default decrease value if the buffer occupancy rate of change value is slightly negative.

22. A resource management cell information generator as defined in claim 18 in which the periodic statistic generator generates a buffer occupancy rate of change value identifying the rate of change of buffer occupancy and the flow control rate generator does not update the maximum allowed rate if the buffer occupancy rate of change value is significantly negative.

23. A resource management cell information generator as defined in claim 18 in which said flow control rate generator further updates said maximum allowed rate in relation to a selected target rate value.

24. A resource management cell information generator as defined in claim 18 in which said flow control rate generator further updates said maximum allowed rate in relation to a minimum cell rate value identified in a resource management cell.

25. A resource management cell information generator as defined in claim 2 in which one operational mode is a constant decrease mode, the periodic statistic generator updating the maximum allowed rate value as a previous maximum allowed rate value, times a predetermined decrement factor if the buffer's cell occupancy region is associated with said constant decrease mode.

26. A resource management cell information generator as defined in claim 25 in which one cell occupancy region is a densely occupied region, in which the buffer is densely occupied, the constant decrease mode being associated with said densely-occupied region.

27. A resource management cell information generator as defined in claim 26 in which said flow control rate generator further updates said maximum allowed rate in relation to a selected target rate value.

28. A resource management cell information generator as defined in claim 26 in which said flow control rate generator further updates said maximum allowed rate in relation to a minimum cell rate value identified in a resource management cell.

29. A resource management cell information generator as defined in claim 2 in which the periodic statistic generator further updates the maximum allowed rate value in response to a resource management cell counter which is incremented when the switching node receives a resource management cell in the downstream direction, the periodic statistic generator decrementing the resource management cell counter when it updates the maximum allowed rate value.

30. A resource management cell information generator as defined in claim 29 in which the periodic statistic generator does not update the maximum allowed rate value if the resource management cell counter identifies a value which is less than a predetermined resource management cell count value.

31. A resource management cell information generator as defined in claim 2, the periodic statistic generator further including a resource management cell counter which is incremented when the switching node receives a resource management cell in the downstream direction, the periodic statistic generator resetting said resource management cell counter if the buffer is operating in a region associated with a selected operating mode.

32. A resource management cell information generator as defined in claim 31 in which said flow control rate generator further updates said maximum allowed rate so as not to exceed a selected target rate value.

33. A method of generating flow control information for use in connection with a switching node for a digital network, said digital network including a source device and a destination device, said source device generating cells for transmission at a selected transmission rate to said destination device over a path through said switching node to transmit data in a downstream direction form said source device to said destination device, said source device further periodically generating resource management cells for transmission to said destination device over said path in said downstream direction, said destination device returning said resource management cells through said switching node to said source device, said switching node including a buffer for buffering cells transmitted in said downstream direction, a cell receiver for receiving cells from said digital network and buffering the received cells in said buffer, a cell transmitter for transmitting cells buffered in said buffer, said flow control information being generated for inclusion in resource management cells to be transmitted by said cell transmitter, said flow control information being generated according to the steps of:

determining a value for a current buffer occupancy identifier variable associated with the occupancy of said buffer at a current time;

determining a value for a prior buffer occupancy identifier variable associated with the occupancy of said buffer at a prior time to the current time;

determining a value for an occupancy rate of change identifier variable which is a difference between said current buffer occupancy identifier value and said prior buffer occupancy identifier value associated with the occupancy of said buffer at the prior time to the current time;

periodically updating a maximum allowed cell rate value as a function of said occupancy rate of change identifier value; and generating said flow control information for inclusion in a resource management cell buffered in said buffer, a flow control rate generator generating said flow control information in relation to said maximum allowed cell rate value most recently generated by a periodic statistic generator and an adjustment factor value generated in relation to changes in said buffer occupancy.

34. A resource management cell information generator for use in connection with a switching node for a digital network, said digital network including a source device and a destination device, said source device generating cells for transmission at a selected transmission rate to said destination device over a path through said switching node to transmit data in a downstream direction from said source device to said destination device, said source device further periodically generating resource management cells for transmission to said destination device over said path in said downstream direction, said destination device returning said resource management cells through said switching node to said source device, said switching node including a buffer for buffering cells transmitted in said downstream direction, a cell receiver for receiving cells from said digital network and buffering the received cells in said buffer, a cell transmitter for transmitting cells buffered in said buffer, said resource management cell information generator generating flow control information for inclusion in resource management cells to be transmitted by said cell transmitter, said resource management cell information generator including:

- a periodic statistic generator for periodically updating a maximum allowed cell rate value having a forward RM cell counter which controls a rate at which said maximum allowed cell rate may increase and accommodates clustering of forward RM cells and imitates a more regularly-spaced stream of forward RM cells and increases and decreases said maximum allowed cell rate less often during periods in which forward RM cells are received at a relatively rapid rate, and more often during periods in which forward RM cells are received at a relatively slower rate; and
- a flow control rate generator for generating said flow control information for inclusion in a resource management cell buffered in said buffer, said flow control rate generator generating said flow control information in relation to said maximum allowed cell rate value most recently generated by said periodic statistic generator and an adjustment factor value generated in relation to changes in said buffer occupancy.

35. A method of generating flow control information for use in connection with a switching node for a digital network, said digital network including a source device and a destination device, said source device generating cells for transmission at a selected transmission rate to said destination device over a path through said switching node to transmit data in a downstream direction form said source device to said destination device, said source device further periodically generating resource management cells for transmission to said destination device over said path in said downstream direction, said destination device returning said resource management cells through said switching node to said source device, said switching node including a buffer for buffering cells transmitted in said downstream direction, a cell receiver for receiving cells from said digital network and buffering the received cells in said buffer, a cell transmitter for transmitting cells buffered in said buffer, said flow control information being generated for inclusion in resource management cells to be transmitted by said cell transmitter, said flow control information being generated according to the steps of:

periodically updating a maximum allowed cell rate value by controlling a rate at which said maximum allowed cell rate may increase with a forward RM cell counter which also accommodates clustering of forward RM cells and imitates a more regularly-spaced stream of forward RM cells and increases and decreases said maximum allowed cell rate less often during periods in which forward RM cells are received at a relatively rapid rate, and more often during periods in which forward RM cells are received at a relatively slower rate; and generating said flow control information for inclusion in a resource management cell buffered in said buffer, a flow control rate generator generating said flow control information in relation to said maximum allowed cell rate value most recently generated by a periodic statistic generator and an adjustment factor value generated in relation to changes in said buffer occupancy.

* * * * *